(12) United States Patent
Takahashi et al.

(10) Patent No.: US 10,810,776 B2
(45) Date of Patent: Oct. 20, 2020

(54) IMAGE PROCESSING DEVICE AND IMAGE PROCESSING METHOD

(71) Applicant: SONY CORPORATION, Tokyo (JP)

(72) Inventors: Masahiro Takahashi, Kanagawa (JP); Takahiro Tsuge, Tokyo (JP); Hidenori Karasawa, Kanagawa (JP); Hiromi Iizuka, Kanagawa (JP); Ryo Miyake, Kanagawa (JP); Hiroshi Nakayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/347,997

(22) PCT Filed: Sep. 25, 2017

(86) PCT No.: PCT/JP2017/034525
§ 371 (c)(1),
(2) Date: May 7, 2019

(87) PCT Pub. No.: WO2018/096775
PCT Pub. Date: May 31, 2018

(65) Prior Publication Data
US 2019/0272658 A1    Sep. 5, 2019

(30) Foreign Application Priority Data
Nov. 28, 2016 (JP) .................. 2016-229860

(51) Int. Cl.
*G06T 11/60* (2006.01)
*G06T 3/40* (2006.01)
(Continued)

(52) U.S. Cl.
CPC ............. *G06T 11/60* (2013.01); *G06T 3/40* (2013.01); *H04N 1/387* (2013.01); *H04N 5/232* (2013.01); *G06T 2210/22* (2013.01)

(58) Field of Classification Search
CPC . G06T 11/60; G06T 3/40; G06T 19/20; G06T 2210/22; G06T 2219/008
See application file for complete search history.

(56) References Cited

U.S. PATENT DOCUMENTS

| | | | |
|---|---|---|---|
| 2011/0150321 A1* | 6/2011 | Cheong | G06T 5/002 382/154 |
| 2012/0086780 A1* | 4/2012 | Sharma | H04N 13/239 348/46 |

(Continued)

FOREIGN PATENT DOCUMENTS

| | | |
|---|---|---|
| EP | 2437503 A2 | 4/2012 |
| JP | 2010-079570 A | 4/2010 |

(Continued)

OTHER PUBLICATIONS

English language translation of and Japanese language original of International Written Opinion of PCT Application No. PCT/JP2017/034525, dated Nov. 28, 2017, 24 pages. (Year: 2017).*

(Continued)

*Primary Examiner* — Jeffery A Brier
(74) *Attorney, Agent, or Firm* — Chip Law Group

(57) ABSTRACT

It is intended to easily generate an edited image from which various and natural feelings are obtained. Depth information of pixels in an image which is set as a processing object is used therefor. Reference depth information serving as a comparison reference for the depth information of pixels in image processing is set. In addition, an image editing process is performed using the reference depth information and the depth information of the pixels of the image which is set as the processing object.

18 Claims, 28 Drawing Sheets

(51) Int. Cl.
*H04N 5/232* (2006.01)
*H04N 1/387* (2006.01)

(56) References Cited

U.S. PATENT DOCUMENTS

| | | | | |
|---|---|---|---|---|
| 2013/0071028 | A1* | 3/2013 | Schiller | G06T 7/11 |
| | | | | 382/180 |
| 2013/0129233 | A1* | 5/2013 | Schiller | G06T 11/60 |
| | | | | 382/228 |
| 2014/0125661 | A1 | 5/2014 | Kurosaki et al. | |
| 2016/0035074 | A1* | 2/2016 | Jeong | G06T 3/40 |
| | | | | 382/282 |
| 2016/0044228 | A1* | 2/2016 | Kim | H04N 5/23216 |
| | | | | 348/345 |
| 2016/0080717 | A1* | 3/2016 | Reiss | H04N 13/156 |
| | | | | 348/43 |
| 2016/0117077 | A1* | 4/2016 | Xu | G06T 11/60 |
| | | | | 715/848 |

FOREIGN PATENT DOCUMENTS

| | | |
|---|---|---|
| JP | 2012-094111 A | 5/2012 |
| JP | 2014-146162 A | 8/2014 |
| JP | 2015-103960 A | 6/2015 |

OTHER PUBLICATIONS

International Search Report and Written Opinion of PCT Application No. PCT/JP2017/034525, dated Nov. 28, 2017, 14 pages of ISRWO.

* cited by examiner

FIG. 2
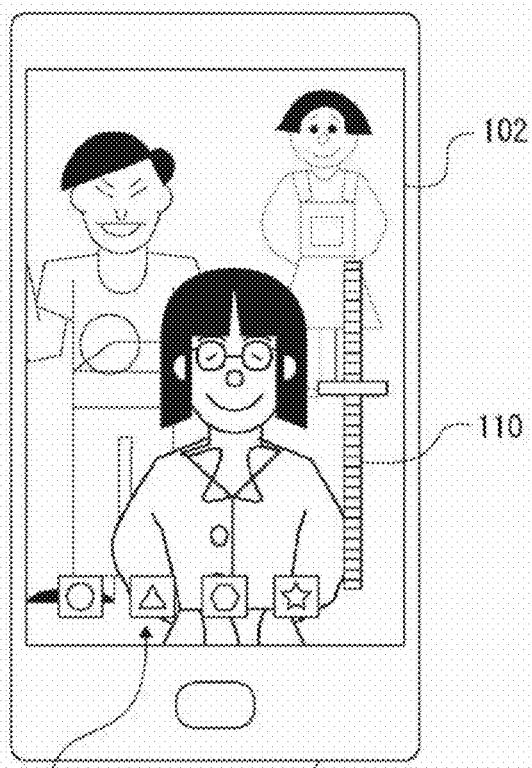

FIG. 3

|   | 0 | 1 | 2 | ... | m |
|---|---|---|---|-----|---|
| 0 | \<PX0-0\> DP0-0 | \<PX0-1\> DP0-1 | \<PX0-2\> DP0-2 | | \<PX0-m\> DP0-m |
| 1 | \<PX1-0\> DP1-0 | \<PX1-1\> DP1-1 | \<PX1-2\> DP1-2 | | |
| ⋮ | | | | | |
| n | \<PXn-0\> DPn-0 | | | | \<PXn-m\> DPn-m |

FIG. 5
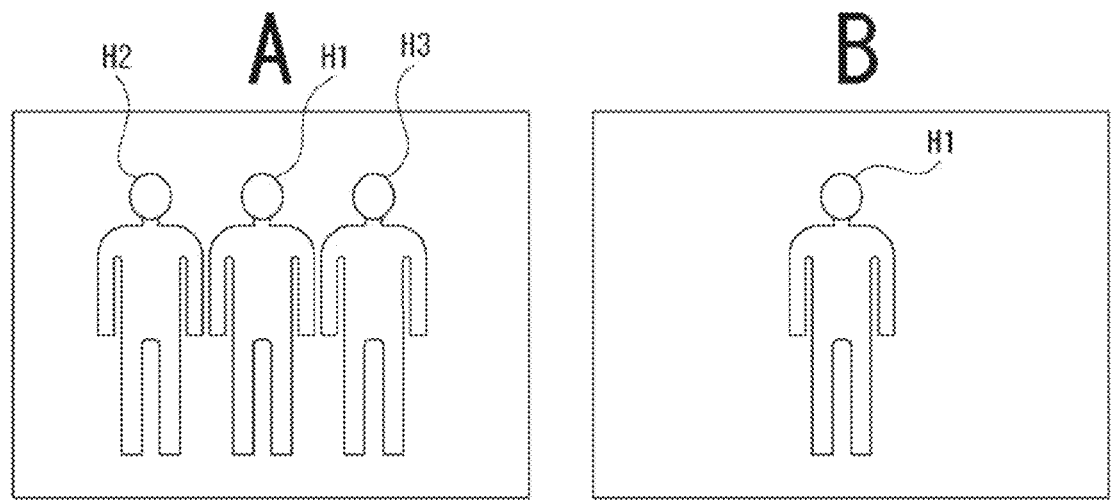
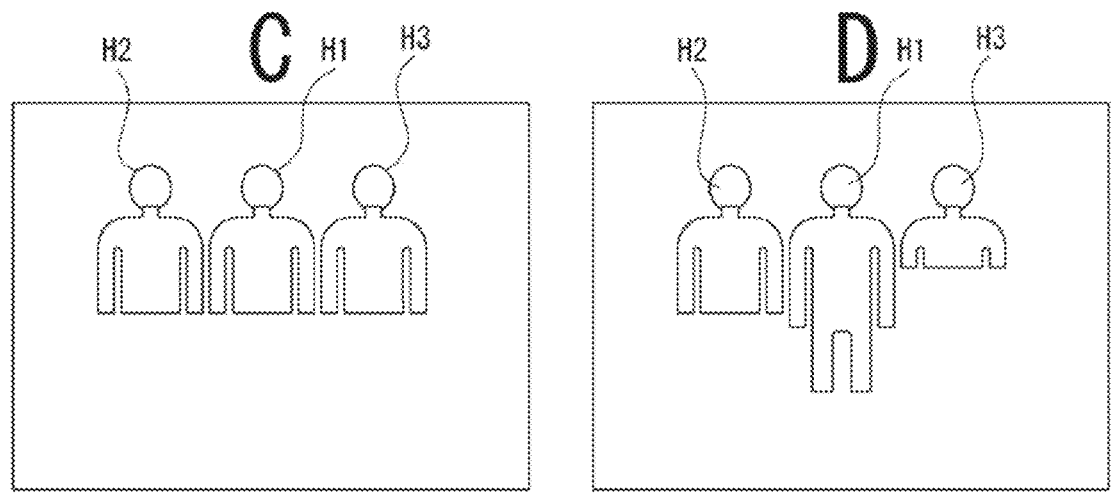

FIG. 6
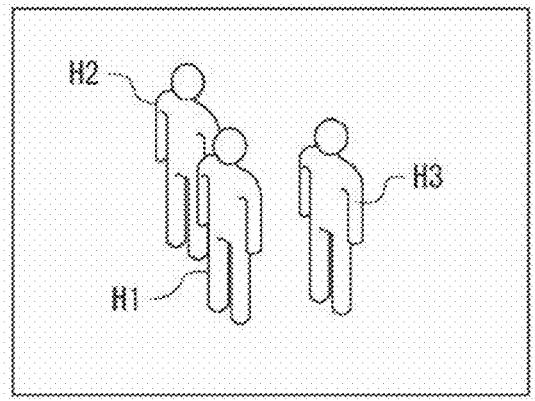
A
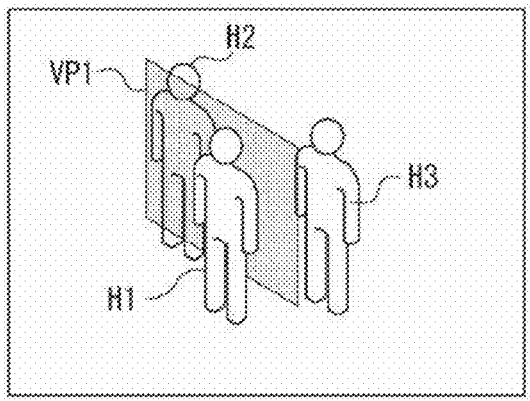
B
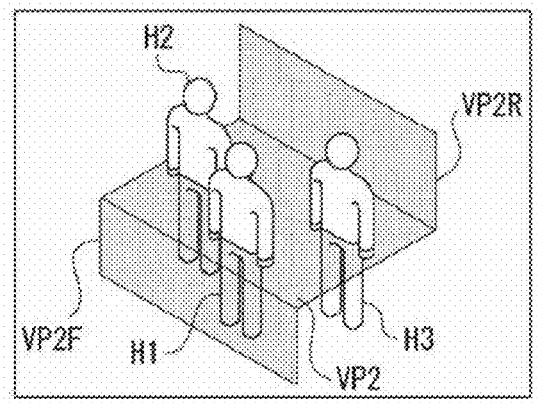
C
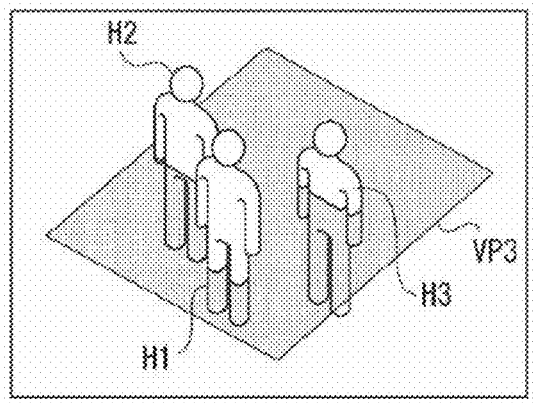
D

FIG. 10
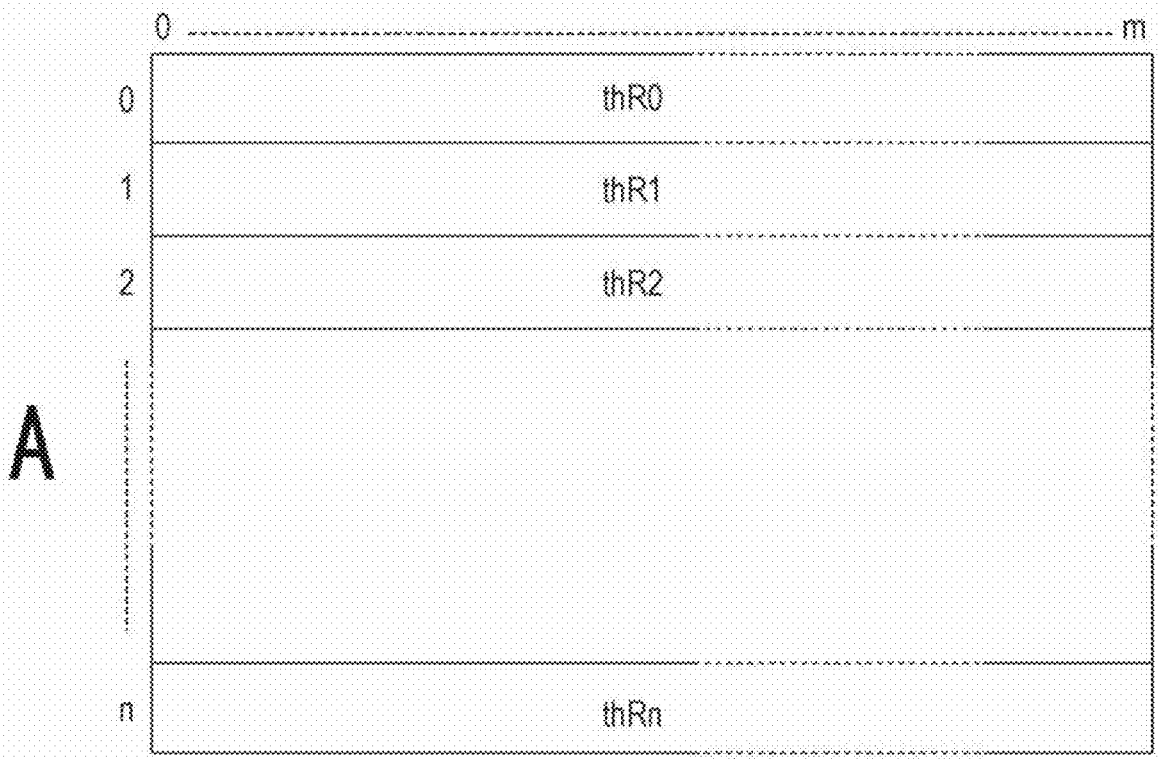
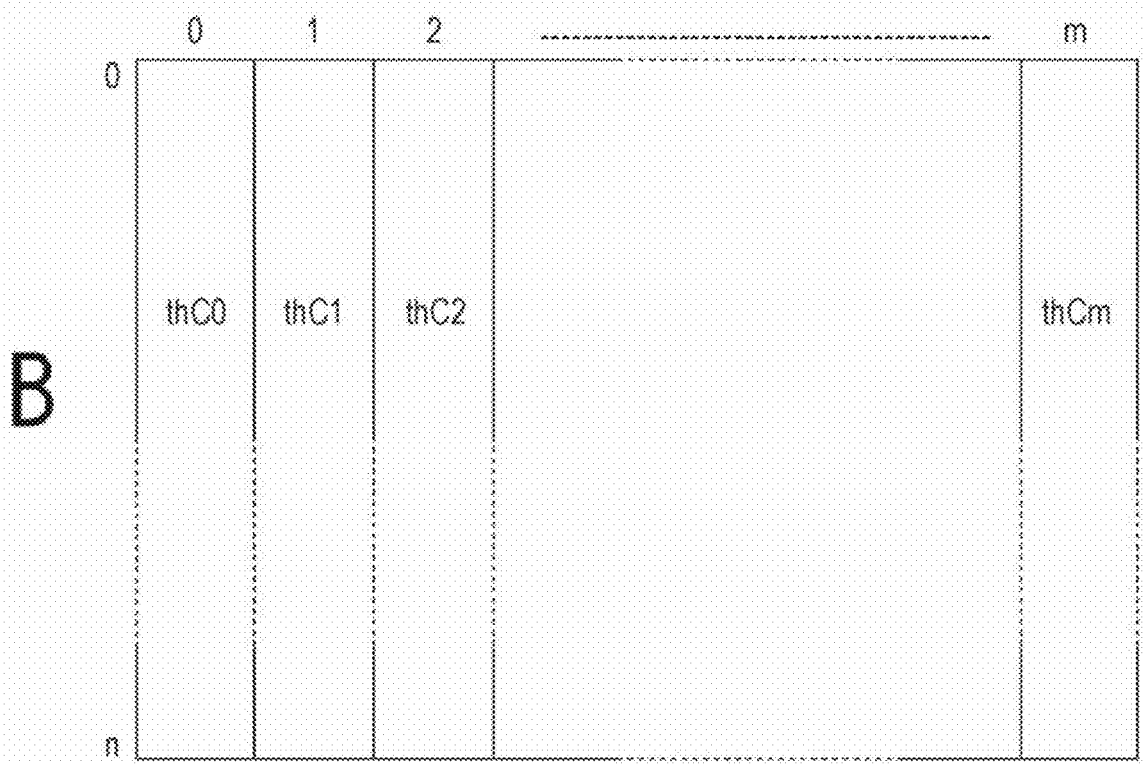

FIG. 13
A
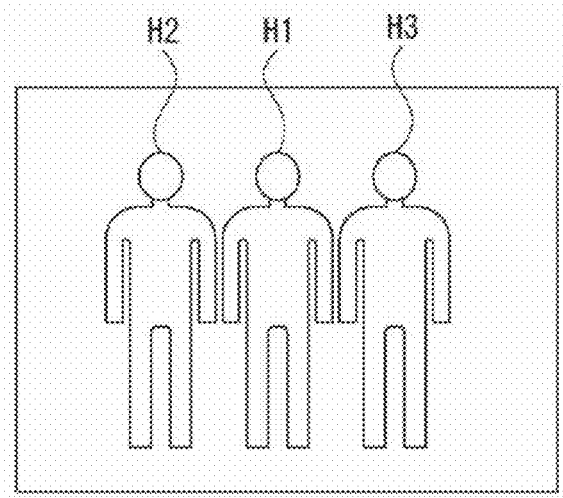
B
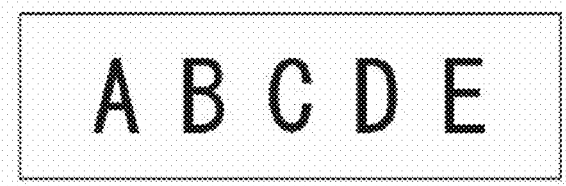
C
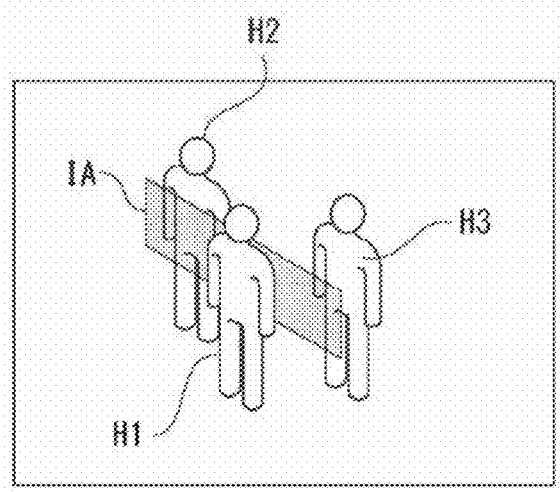
D
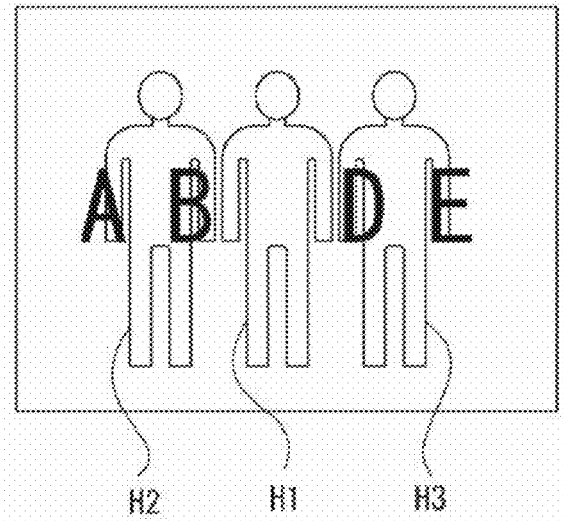

FIG. 14
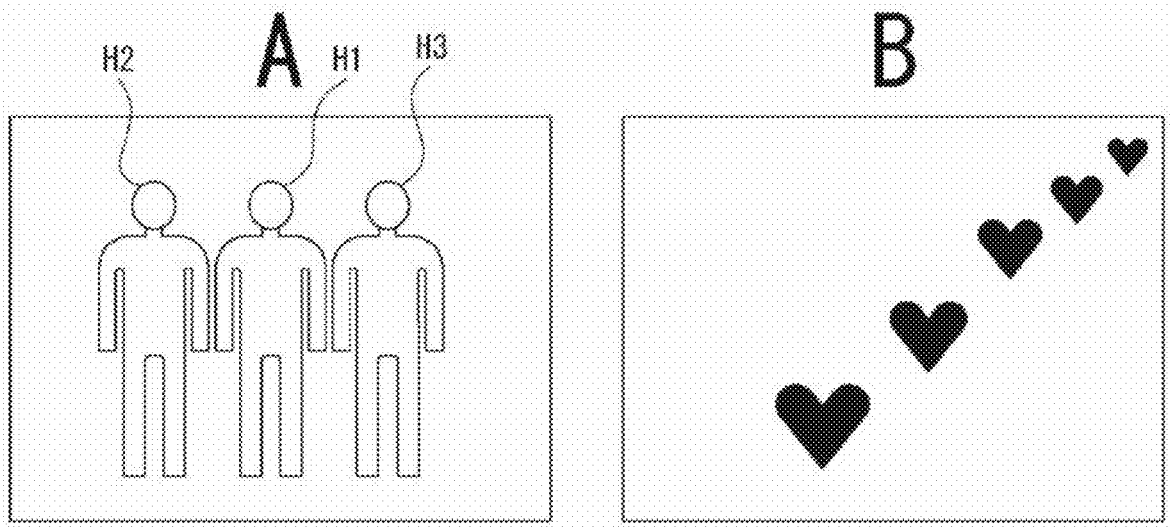
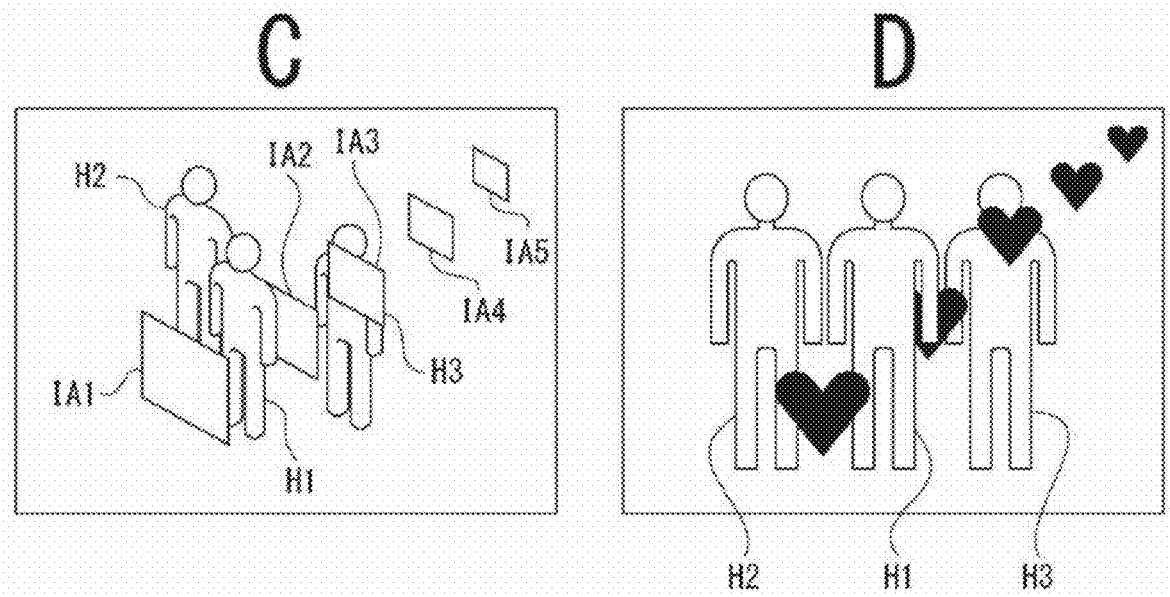

FIG. 16
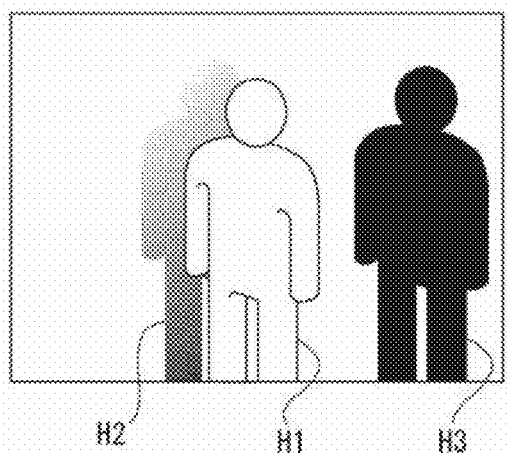
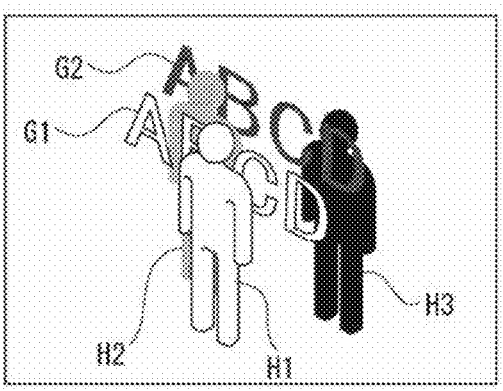
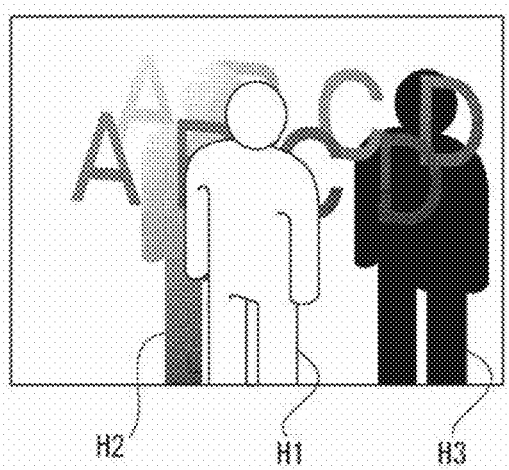

FIG. 18
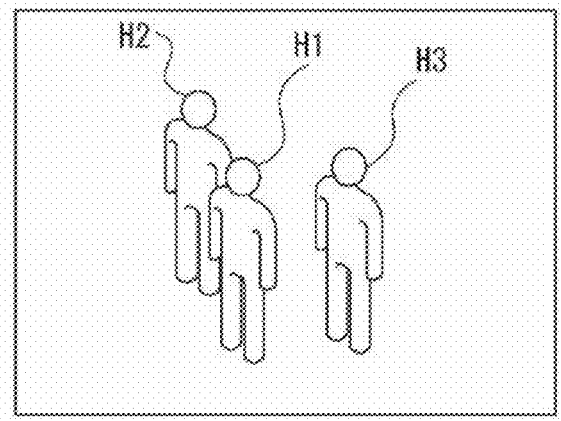
A
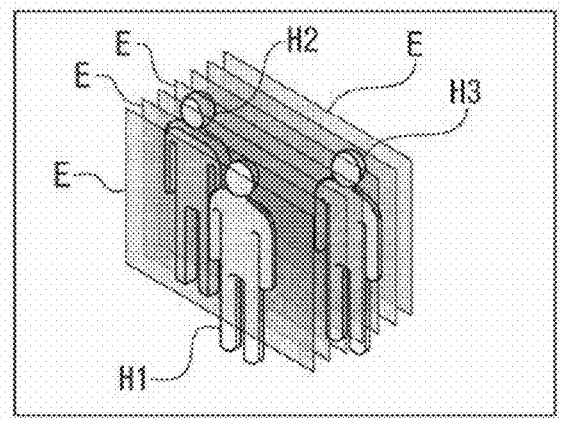
B
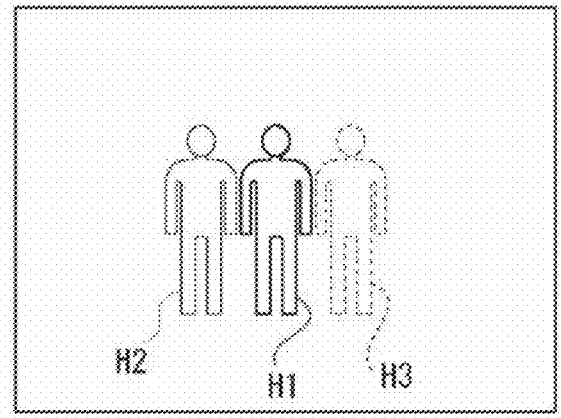
C

FIG. 21
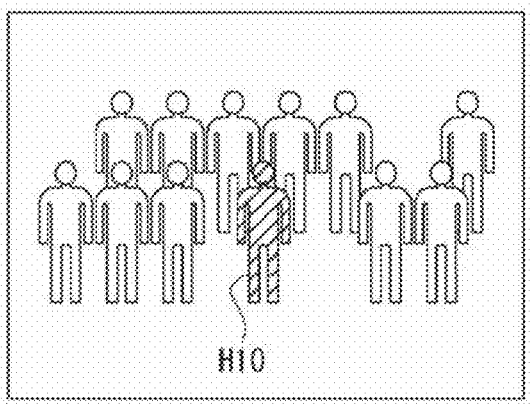
A
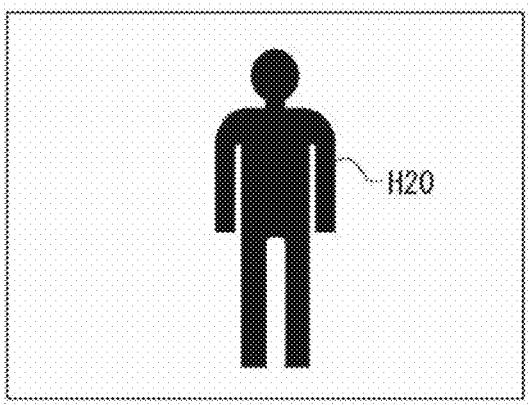
B
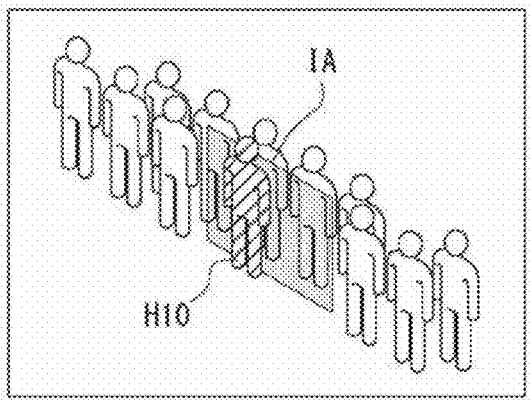
C
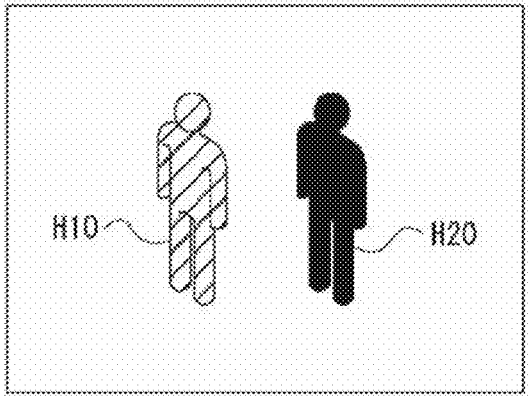
D
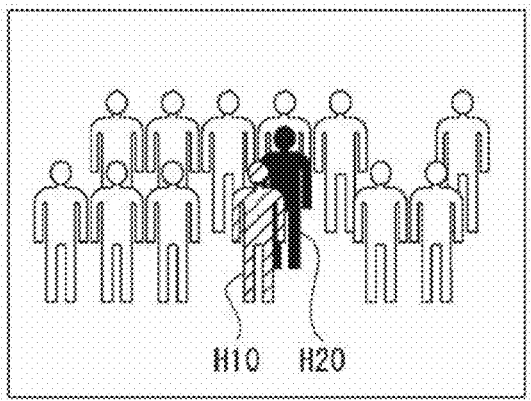
E

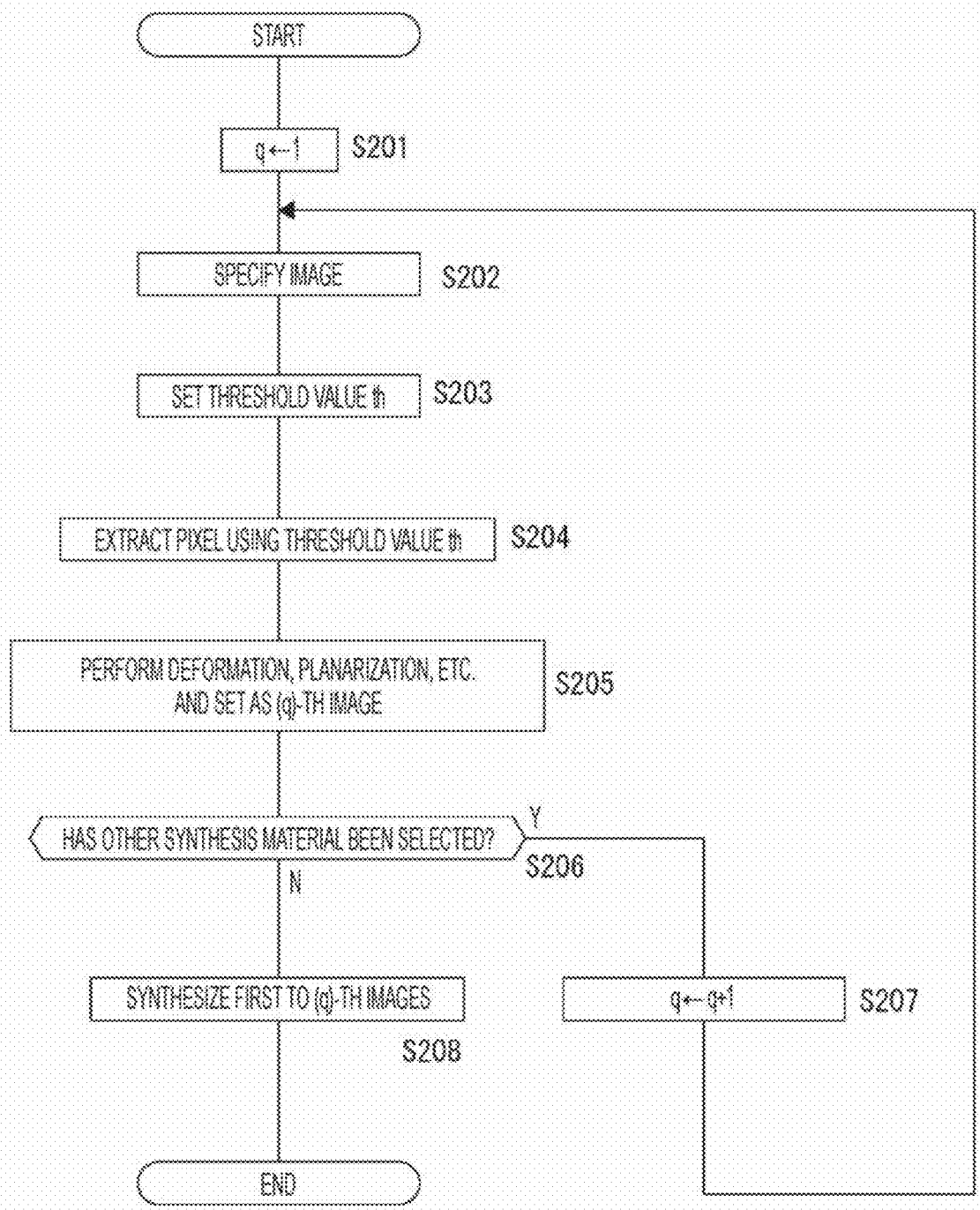

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/034525 filed on Sep. 25, 2017, which claims priority benefit of Japanese Patent Application No. JP 2016-229860 filed in the Japan Patent Office on Nov. 28, 2016. Each of the above-referenced applications is hereby incorporated herein by reference in its entirety.

TECHNICAL FIELD

The present technology relates to an image processing device, an image processing method, and a program for editing one or a plurality of images which are set as a processing object.

BACKGROUND ART

Image processing technologies for performing a variety of image editing are known.

In Patent Document 1, it is stated that a process of determining a layout in consideration of a positional relationship when a plurality of images are arranged and composed.

CITATION LIST

Patent Document

Patent Document 1: Japanese Patent Application Laid-Open No. 2010-79570

SUMMARY OF THE INVENTION

Problems to be Solved by the Invention

With recent spread of social media, sharing of photographs or moving images by general users is performed every day. Accordingly, application programs for applying effects to images have spread, and situations in which representations are normalized and individualities of users are not exhibited well have occurred.

On the other hand, in order to perform advanced and creative editing as synthesis of images, application of image effects, and the like, images need to be directly processed using a dedicated tool, special functions are required, and much labor or time is also required. Further, a degree of completion of an edited image reflects a user's skill, and thus there are many products which cannot be said to have a natural finish. Accordingly, general users cannot easily perform such image editing.

Therefore, an objective of the present technology is to enable a general user to easily perform various and advanced image editing.

Solutions to Problems

According to the present technology, there is provided an image processing device including: a reference depth setting unit configured to set reference depth information serving as a comparison reference for depth information of pixels in an image which is set as a processing object; and an image editing processing unit configured to perform an image editing process using the reference depth information and the depth information of the pixels of the image which is set as the processing object.

In this case, image data including depth information which is a value of a distance (depth) to a subject for each pixel is set as a processing object. Incidentally, the depth information may be added for each pixel of the image data, or may be added for each pixel block as a color pixel (for example, a unit of three pixels including an R pixel, a G pixel, and a B pixel), for example. Alternatively, the depth information may be added for each pixel block of four pixels, nine pixels, or the like.

The reference depth information is a threshold value of a depth serving as a comparison reference, a value indicating a certain depth, an insertion depth, or a depth range serving as a processing reference, or the like.

The image processing device compares the depth information with the reference depth information for each pixel (pixel block) and performs image processing based on the result of comparison.

In the image processing device according to the present technology, the reference depth setting unit may set the reference depth information in response to an operation input.

That is, a user can arbitrarily set reference depth information which is used in image processing.

In the image processing device according to the present technology, the reference depth setting unit may set a depth threshold value as the reference depth information, and the image editing processing unit may perform an image editing process of generating a trimming image of an extracted subject on the basis of a result of comparison between the depth information of each pixel of the image which is set as the processing object and the depth threshold value.

That is, a threshold value is set in the depth direction of a subject and a pixel to be displayed is extracted from the image to be processed using the threshold value as a reference depth.

In the image processing device according to the present technology, the reference depth setting unit may set a common depth threshold value which is compared with all the pixels of the image which is set as the processing object.

One value is set as the depth threshold value, the threshold value is compared with all pixels of an image to be processed, and pixels to be displayed are extracted as the result of comparison.

In the image processing device according to the present technology, the reference depth setting unit may set a plurality of depth threshold values, and the image editing processing unit may compare the depth information of each pixel with the depth threshold value corresponding to the pixel for each pixel.

A plurality of depth threshold values are set. For example, different depth threshold values are set for areas of an image or corresponding depth threshold values are set for pixels. Then, each pixel is compared with the corresponding depth threshold value, and pixels to be displayed are extracted.

In the image processing device according to the present technology, the image editing processing unit may acquire information of a subject to be trimmed, and the image editing processing unit may perform an image editing process of generating a trimming image using a result of comparison with the depth threshold value for each pixel of the image to be processed and a result of determination of whether or not the pixel is a pixel of the subject to be trimmed.

In this case, determination of whether or not each pixel is a pixel of a subject determined using subject recognition by image analysis is also performed, and pixels to be displayed are extracted as the result of determination in addition to the result of comparison of depth.

In the image processing device according to the present technology, the reference depth setting unit may set a depth threshold value as the reference depth information, and the image editing processing unit may perform a process of setting a pixel which is determined to be one of a near side and a deep side of the depth threshold value as a pixel to be displayed and replacing a value of a pixel which is determined to be the other of the near side and the deep side with another value on the basis of a result of comparison between the depth information of each pixel of the image which is set as the processing object and the depth threshold value.

That is, a threshold value is set in the depth direction of a subject, and pixels to be displayed without any change and pixels of which the pixel value is to be replaced are partitioned on the near side and the deep side using the threshold value as a reference depth.

In the image processing device according to the present technology, the image editing processing unit may perform an image editing process of replacing a pixel value with a value for not displaying a subject or a value for giving a display effect on all the pixels which are determined to be the other of the near side and the deep side.

For example, when pixels of a subject on the other side which are partitioned using the depth threshold value are replaced with a value for not displaying the subject such that the pixel value becomes a pixel value not associated with the original subject, a trimming image in which a subject on the other side is not displayed and only a subject on one side is displayed can be generated.

Further, for example, when pixels of a subject on the other side which are partitioned using the depth threshold value are replaced with values for giving an image effect to the subject, a trimming image in which a subject on one side is displayed originally and an image effect is applied to a subject on the other side can be generated.

In the image processing device according to the present technology, the image editing processing unit may perform an image editing process of replacing a pixel value of which pixel is determined to be the other of the near side and the deep side with a pixel value of another image.

For example, when pixels of a subject on the other side which are partitioned using the depth threshold value are replaced with pixel values of pixels of another image, an image in which a subject on one side is displayed originally and a subject of another image is synthesized with the other side can be generated.

In the image processing device according to the present technology, the reference depth setting unit may set an insertion depth as the reference depth information, and the image editing processing unit may perform an image editing process of determining an anteroposterior relationship between a pixel of a second image and a pixel of a first image on the basis of a result of comparison between the depth information of each pixel of the first image and the insertion depth and generating a synthetic image on the basis of a result of determination as a process of synthesizing the second image with the first image.

The first image is, for example, a photograph image or the like and a subject has depth information. On the other hand, it is assumed that the second image does not have depth information. For example, the second image is an originally two-dimensional image such as an image of characters or a two-dimensionally generated graphic. A depth at which the second image is inserted into the first image is set as the insertion depth. Synthesis is performed such that the second image is located at the position of the depth.

In the image processing device according to the present technology, the image editing processing unit may perform image effect processing based on the insertion depth on the second image.

The second image is synthesized to be inserted into the first image at a depth position of the set insertion depth. An image effect corresponding to the insertion depth is given to the second image.

Further, when a plurality of second images are synthesized at different insertion depths, each second image is subjected to an image effect corresponding to the insertion depth thereof.

In the image processing device according to the present technology, the reference depth setting unit may set a depth reference value as the reference depth information, and the image editing processing unit may perform an image editing process of setting an image effect level on the basis of a result of comparison between the depth information and the depth reference value for each pixel of the image which is set as the processing object and performing image effect processing on the image which is set as the processing object.

That is, when an image effect is performed on an image to be processed, an effect level (strength of an effect) based on a depth of a subject is set. For example, such setting is based on a difference between the depth reference value and the depth information of a pixel.

In the image processing device according to the present technology, the reference depth setting unit may set an insertion depth as the reference depth information, and the image editing processing unit may perform an image editing process of changing the sizes of one or both of a subject of a first image and a subject of a second image, determining an anteroposterior relationship between a pixel of the second image and a pixel of the first image on the basis of a result of comparison between the depth information of each pixel of the first image and the insertion depth and generating a synthetic image on the basis of a result of determination as a process of synthesizing the second image with the first image.

For example, it is assumed that images having different scales or times are synthesized as the first image and the second image. In this case, a depth at which the second image is inserted into the first image is set as the insertion depth. A synthesis process is performed such that a size of a subject of the second image is changed and the second image is inserted into the position of the depth.

In the image processing device according to the present technology, the image editing processing unit may perform a process of synthesizing a subject image trimmed from the second image with the first image.

For example, a synthesis process is performed such that some subjects of the second image are extracted by trimming, the size of one or both of a subject of the first image and a subject of the second image is changed, and the trimmed subject of the second image is inserted into the first image.

In the image processing device according to the present technology, the image editing processing unit may perform image effect processing based on the insertion depth on a subject image trimmed from the second image.

For example, the second image of which the size relationship with the first image has changed is synthesized to be inserted into the first image at the depth position of the set insertion depth. An image effect corresponding to the insertion depth is given to the second image.

Further, when a plurality of second images are synthesized with different insertion depths, each second image is subjected to an image effect corresponding to the insertion depth thereof.

In the image processing device according to the present technology, the reference depth setting unit may set a plurality of depth threshold values as the reference depth information, and the image editing processing unit may perform an image editing process of synthesizing images obtained by planarizing pixels extracted using the depth threshold values from the image which is set as the processing object.

That is, a subject is cut using some depth threshold values and is planarized. The subject is planarized and is synthesized to be superimposed, for example, in the original positional state.

In the image processing device according to the present technology, the image editing processing unit may set a plurality of depth threshold values in a range of from a minimum value to a maximum value as the depth information of each pixel of the image to be processed.

Accordingly, a subject can be appropriately cut out.

In the image processing device according to the present technology, the reference depth setting unit may set one or a plurality of depth threshold values as the reference depth information, and the image editing processing unit may perform an image editing process of extracting subject images from one or a plurality of images using the set one or plurality of depth threshold values and synthesizing the extracted subject images.

In this case, subject images can be cut out using the depth information and a plurality of cut-out subject images can be synthesized.

According to the present technology, there is provided an image processing method which is performed by an information processing device, the image processing method including: a reference depth setting process of setting reference depth information serving as a comparison reference for depth information of pixels in an image which is set as a processing object; and an image editing processing process of performing an image editing process using the reference depth information and the depth information of the pixels of the image which is set as the processing object.

According to the present technology, there is provided a program causing an information processing device to perform process steps corresponding to such processes.

With such method or program, it is possible to provide an image processing device that can easily realize various image editing.

Effects of the Invention

According to the present technology, it is possible to provide an environment in which general users can easily perform advanced image processing as a variety of image editing such as synthesis of images and application of image effects without requiring advanced skills.

Incidentally, advantageous effects described herein are not restrictive and any advantageous effect described in this disclosure may be achieved.

BRIEF DESCRIPTION OF DRAWINGS

FIGS. 2A and 2B are diagrams describing an operation form for image processing according to an embodiment.

FIG. 3 is a diagram describing depth information of an image to be processed according to an embodiment.

FIGS. 5A, 5B, 5C, and 5D are diagrams describing trimming images according to a first embodiment.

FIGS. 6A, 6B, 6C, and 6D are diagrams describing a process of cutting a trimming image according to the first embodiment.

FIGS. 10A and 10B are diagrams describing an example in which a threshold value which is reference depth information is set for each pixel according to an embodiment.

FIGS. 13A, 13B, 13C, and 13D are diagrams describing a synthetic image according to a second embodiment.

FIGS. 14A, 14B, 14C, and 14D are diagrams describing a synthetic image according to the second embodiment.

FIGS. 16A, 16B, and 16C are diagrams describing a synthetic image according to a modified example of the second embodiment.

FIGS. 18A, 18B, and 18C are diagrams describing an effect image according to a third embodiment.

FIGS. 21A, 21B, 21C, 21D, and 21E are diagrams describing a synthetic image according to a fourth embodiment.

FIG. 28 is a flowchart illustrating another example of an image editing process according to the fifth embodiment.

MODE FOR CARRYING OUT THE INVENTION

Hereinafter, embodiments will be described in the following order.

<1. Configuration of Image Processing Device>
<2. First Embodiment>
<3. Second Embodiment>
<4. Third Embodiment>
<5. Fourth Embodiment>
<6. Fifth Embodiment>
<7. Conclusion and Modified Examples>

1. Configuration of Image Processing Device

Figure 1:
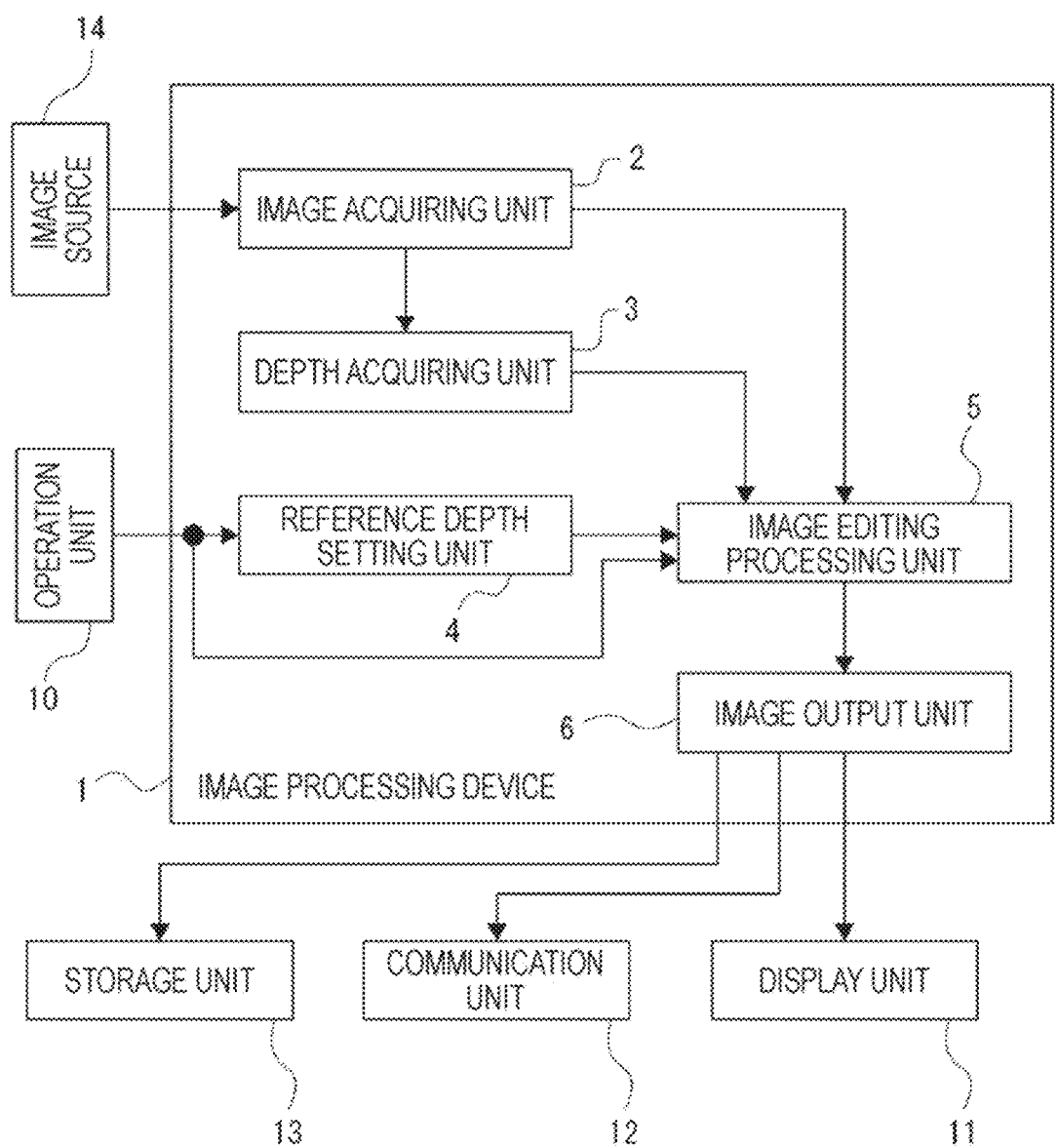
FIG. 1 is a block diagram illustrating an image processing device according to an embodiment of the present technology.

FIG. 1 illustrates a functional configuration of an image processing device 1 according to the present disclosure and a peripheral configuration of the image processing device 1. The image processing device 1 includes an image acquiring unit 2, a depth acquiring unit 3, a reference depth setting unit 4, an image editing processing unit 5, and an image output unit 6.

Further, an operation unit 10, a display unit 11, a communication unit 12, a storage unit 13, and an image source 14 are illustrated as an example of the peripheral configuration of the image processing device 1.

The operation unit 10, the display unit 11, the communication unit 12, the storage unit 13, and the image source 14 may be provided in a device which is formed integrally with the image processing device 1 or may be connected as separate devices to the image processing device 1 by wired or wireless communication.

First, the peripheral configuration of the image processing device 1 will be described.

The operation unit 10 detects various operations for image editing from a user. The operation unit 10 may be configured to detect an operation of an operator such as an actual key or switch or may be configured to detect an operation of a mouse or a keyboard in a computer device or an operation such as a voice input, a gesture input, or a noncontact input.

Further, the operation unit 10 may be configured, for example, to detect a touch operation, a tap operation, or the like in a mobile terminal 101 such as a smartphone illustrated in FIG. 2A. FIG. 2A illustrates a state in which an image to be edited is displayed on a screen 102, for example, in the mobile terminal 101 in which the image processing device 1 is mounted. FIG. 2B illustrates a state in which operation buttons 111 and a slide lever 110 for a touch operation are further displayed on the screen 102. A user can perform various operations for image editing using the operation buttons 111 or the slide lever 110.

The display unit 11 is a display unit that performs various displays for a user (a photographer or the like) and is, for example, a display device such as a liquid crystal display (LCD) or an organic electroluminescence (EL) display which is provided in the housing of a device including the image processing device 1. For example, the display unit 11 is an LCD or the like that forms a screen 102 of a mobile terminal 101 illustrated in FIG. 2A or the like. Alternatively, the display unit 11 may be a display device which is separate from the device including the image processing device 1.

Various displays for a user interface are performed in the display unit 11. For example, display of an image (a still image or a moving image) which is generated through an editing process by the image processing device 1, display of an image (a still image or a moving image) before being edited, display of an operator image such as the operation buttons 111 or the slide lever 110, and other necessary display are performed.

The communication unit 12 performs communication with another device by wired or wireless connection. For example, the communication unit 12 performs communication using a communication system based on, for example, a radio communication standard such as wireless fidelity (WiFi: registered trademark) or Bluetooth (registered trademark). Alternatively, the communication unit 12 may transmit and receive image data (a still image file or a moving image file) to and from an external display device, a recording device, a reproduction device, or the like, or may serve as a network communication unit that performs communication using various networks such as the Internet, a home network, a local area network (LAN), and the like, and transmit and receive a variety of data to and from a server, a terminal, or the like on the network.

The communication unit 12 transmits, for example, an image (a still image or a moving image) generated through an editing process by the image processing device 1 to an external device. Further, the communication unit 12 may receive image data which is used for an editing process from the outside.

The storage unit 13 includes, for example, a nonvolatile memory and stores edited image data as an image file of still image data, moving image data, or the like. The storage unit 5 can be embodied in various forms. For example, the storage unit 13 may be a solid-state memory such as a flash memory which is incorporated in a device housing, or may have a form including a memory card which can be attached to and detached from a device (for example, a portable flash memory) and a card recording and reproduction unit which accesses the memory card for recording and reproduction. Further, the storage unit 13 may be embodied as a hard disk drive (HDD), an optical disk, a disk driver, and the like.

The storage unit 13 stores edited image data which is generated by the image processing device 1. Further, image data which is used for an editing process by the image processing device 1 may be read from the storage unit 13.

Incidentally, a program causing a computer device to perform a function of the image processing device 1 may be stored in the storage unit 13.

The image source 14 refers to a source of image data which is used for an editing process by the image processing device 1. Image data of a still image or a moving image to be processed is supplied from the image source 14 to the image processing device 1.

For example, the communication unit 12 or the storage unit 13 may correspond to the image source 14.

The functional configuration of the image processing device 1 will be described below.

The image acquiring unit 2 of the image processing device 1 acquires image data which is an object of an editing process from the image source 14. For example, still image data or the like which is selected by a user's operation is set as a processing object.

The depth acquiring unit 3 detects depth information of pixels in an image which is set as a processing object. In this embodiment, depth information DP is added to image data which is set as an object of an editing process by the image processing device 1 for each pixel. The depth information DP is information of a depth position of a subject at the time of capturing an image.

For example, it is assumed that image data (still image data) includes a pixel array of 0 to n rows and 0 to m columns and includes {(m+1)×(n+1)} pixels PX0-0, PX0-1, . . . , PXn-m, as illustrated in FIG. 3.

Depth information DP0-0, DP0-1, . . . , DPn-m are added to the pixels PX0-0, PX0-1, . . . , PXn-m. Each depth information is depth information of each pixel at the time of capturing an image of a subject. The depth acquiring unit 3 detects depth information DP0-0, DP0-1, . . . , DPn-m from an image which is set as the processing object.

Incidentally, each of the pixels PX0-0 to PXn-m illustrated in FIG. 3 may be considered to be one pixel for each color such as an R pixel, a G pixel, or a B pixel or may be considered to be one color pixel including an R pixel, a G pixel, and a B pixel. That is, depth information DP (DP0-0 to DPn-m) may be added in the unit of pixels or may be added in the unit of color pixels. Furthermore, although not illustrated, depth information DP may be added for each pixel block including a plurality of pixels (or a plurality of color pixels).

The technology of adding depth information of a subject to a captured image is known and thus details thereof will not be described.

Incidentally, the depth acquiring unit 3 may receive and acquire depth information detected by another device or sensor or depth information which has been registered in advance for image data to be processed, and the like. Further, the depth acquiring unit 3 may detect depth information which is arbitrarily set by a user.

The reference depth setting unit 4 performs a process of setting reference depth information serving as a comparison reference for depth information of pixels at the time of image processing.

Although will be described in first to fifth embodiments which will be described later, the reference depth setting unit 4 sets a depth threshold value th for cutting an image or the like (also simply referred to as a "threshold value th"), an insertion depth for insertion of an image or the like (a threshold value thI corresponding to the insertion depth), a depth reference value DPref for determining a depth position as a reference, or the like as reference depth information.

The image editing processing unit 5 performs an image editing process using the reference depth information set by the reference depth setting unit 4 and the depth information DP0-0 to DPn-m of pixels of an image which has been received as a processing object by the image acquiring unit 2. Trimming, synthesis of various images, addition of an image effect, and the like as examples of the image editing process will be described later.

The image output unit 6 outputs image data as an edited image which has been prepared by the image editing processing unit 5. That is, the image output unit 6 outputs edited image data prepared through the editing process to the display unit 11 to display an editing result.

Further, the image output unit 6 may output the prepared edited image data to the communication unit 12 to transmit the edited image data to an external device.

Further, the image output unit 6 may output the prepared edited image data to the storage unit 13 to store the edited image data in a storage medium.

For example, by having the above-mentioned functional configuration as illustrated in FIG. 1, the image processing device 1 according to an embodiment can perform a variety of image editing which will be described later and generate an edited image.

Figure 4:
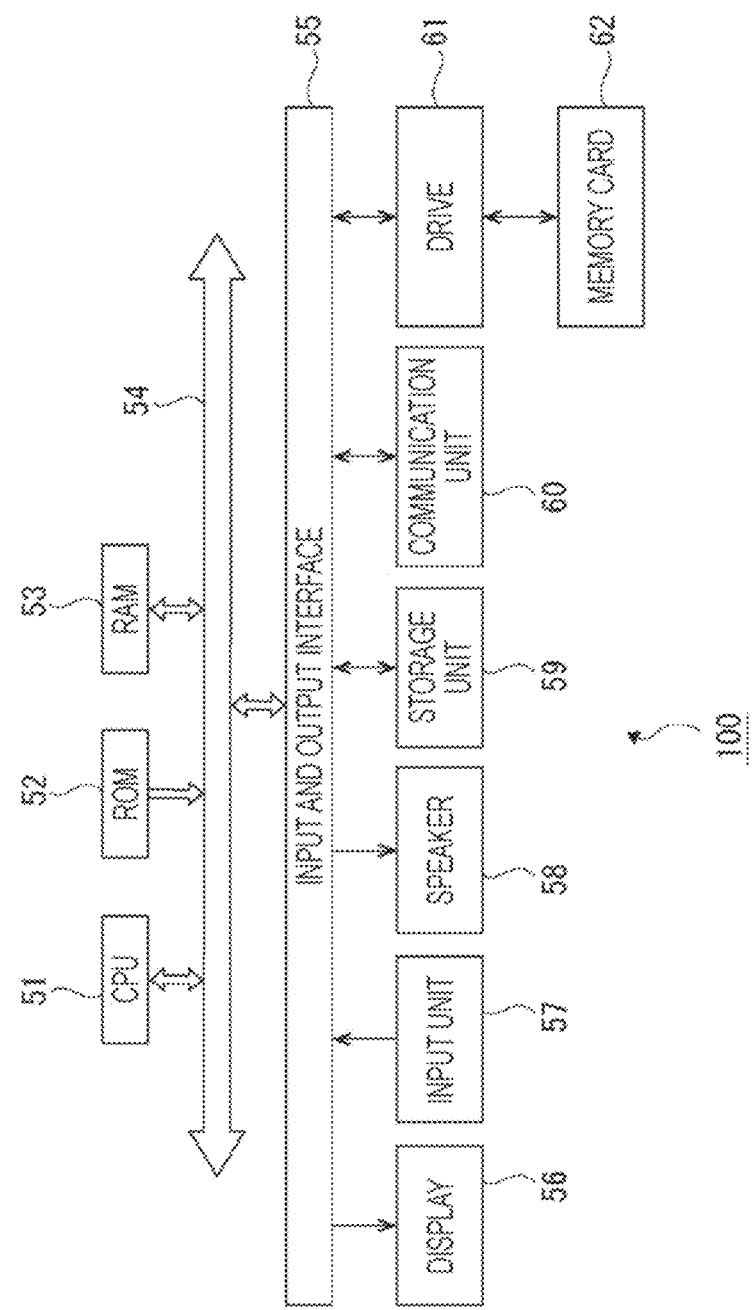
FIG. 4 is a block diagram of an information processing device that embodies an image processing device according to an embodiment.

The image processing device 1 is embodied, for example, as an information processing device 100 having a hardware configuration as illustrated in FIG. 4.

As illustrated in FIG. 4, the information processing device 100 includes a central processing unit (CPU) 51, a read only memory (ROM) 52, a random access memory (RAM) 53.

The CPU 51 performs various processes in accordance with a program stored in the ROM 52 or a program which is loaded from a storage unit 59 to the RAM 53. In addition, data required for causing the CPU 51 to perform various processes or the like is appropriately stored in the RAM 53.

The CPU 51, the ROM 52, and the RAM 53 are connected to each other via a bus 54. An input and output interface 55 is also connected to the bus 54.

A display 56 including a liquid crystal panel, an organic EL panel, or the like, an input unit 57 including a keyboard, a mouse, and the like, a speaker 58, the storage unit 59 including an HDD or the like, a communication unit 60, and the like can be connected to the input and output interface 55.

When the display unit 11 illustrated in FIG. 1 is a device which is formed integrally with the information processing device 100, the display 56 refers to the display unit 11. The display unit 11 may be a device which is separate from the information processing device 100. In this case, the display 56 can be a separate device which is connected to the input and output interface 55.

The input unit 57 illustrated in FIG. 4 refers to an input device which is used by a user who uses the information processing device 100 and also has, for example, a function of the operation unit 10 illustrated in FIG. 1.

The communication unit 60 performs a communication process using a network including the Internet or communication with peripheral devices and also has, for example, a function of the communication unit 12 illustrated in FIG. 1.

In addition, a drive 61 is connected to the input and output interface 55 if necessary, the memory card 62 is attached thereto, and a computer program read from the memory card 62 is installed in the storage unit 59 if necessary or data processed by the CPU 51 is stored therein. The drive 61 may be a recording and reproduction drive for a removable storage medium such as a magnetic disc, an optical disk, or a magneto-optical disk.

The drive 61 and the memory card 62 also have a function of the storage unit 13 illustrated in FIG. 1.

With this hardware configuration, the processes of the image processing device 1 according to the embodiment, that is, the processes, of the image acquiring unit 2, the depth acquiring unit 3, the reference depth setting unit 4, the image editing processing unit 5, and the image output unit 6 which are illustrated in FIG. 1, can be performed. That is, these processes are implemented by software which is started by the CPU 51. A program constituting the software is downloaded from the network or is read from a removable storage medium and is installed in the information processing device 100 illustrated in FIG. 4. Alternatively, the program may be stored in advance in an HDD or the like as the storage unit 59.

Then, by causing the CPU 51 to start the program, various image editing processes can be performed as will be described later in detail.

Incidentally, the image processing device 1 according to the embodiment is not limited to the single information processing device (computer device) 100 having the hardware configuration illustrated in FIG. 4, but may be configured by systematizing a plurality of computer devices. A plurality of computer devices may be systematized by an LAN or the like or may be arranged in remote places by a virtual private network (VPN), for example, using the Internet or the like. The plurality of computer devices may include a computer device which can be used in a cloud computing service.

Further, the information processing device 100 illustrated in FIG. 4 can be embodied as a personal computer of a stationary type, a notebook type, or the like or a mobile terminal such as a tablet terminal or a smartphone. Furthermore, the image processing device 1 according to this embodiment can also be mounted in an electronic device such as a television device, a monitor device, an image editing device, or an imaging device having the function of the information processing device 100.

2. First Embodiment

An example of an editing process in which the image processing device 1 trims a subject with an arbitrary depth using depth information will be described as a first embodiment.

The following will be described as extraction of a subject using depth information herein:
  Cutting of a subject using a virtual vertical plane;
  Cutting of a subject using a virtual horizontal plane/virtual inclined plane; and
  Cutting of a subject in combination of extraction using a virtual plane with image recognition.

First, an example of cutting of a subject using a virtual vertical plane will be described.

FIG. 5A illustrates an image of original image data which is set as a projecting object. This is a still image in which three persons facing the front are imaged as subjects H1, H2, and H3.

The persons of three subjects H1, H2, and H3 are different from each other in position at which a person stands in the depth direction at the time of capturing an image. FIG. 6A illustrates a state in which positional states of the subjects H1, H2, and H3 at the time of capturing images are seen obliquely from the upper side. The subject H1 stands on the nearest side toward a camera having captured the image and the subject H2 stands on the slightly deeper side. In addition, the subject H3 stands on the deepest side.

The positional relationship in the depth direction cannot be easily recognized in the image illustrated in FIG. 5A, the image processing device 1 can recognize positions in the depth direction (depths) of the subjects H1, H2, and H3 because depth information DP is added to the image data for each pixel.

Here, a threshold value th for trimming is set as reference depth information. A virtual vertical plane VP1 illustrated in FIG. 6B is assumed using the threshold value th, and cutting of a subject is performed depending on whether it is anterior or posterior to (on the near side/deep side of) the virtual vertical plane VP1.

In FIG. 6B, the virtual vertical plane VP1 in which the value of the depth which is set as the threshold value th is greater than the value of the depth of the subject H1 and is less than the value of the depth of the subject H2 is illustrated.

In this case, only the subject H1 among the subjects H1, H2, and H3 is on the nearer side than the virtual vertical plane VP1. Accordingly, when the subject on the nearer side than the virtual vertical plane VP1 is trimmed, an edited image in which only the subject H1 appears can be generated as illustrated in FIG. 5B.

Specifically, the image processing device 1 can trim a subject which is anterior to (or on the deep side of) the virtual vertical plane VP1 with the depth set using the threshold value th by setting the threshold value th, comparing the depth information DP of each pixel with the threshold value th, and determining whether or not the pixel is a pixel to be displayed as the result of comparison.

Figure 7:
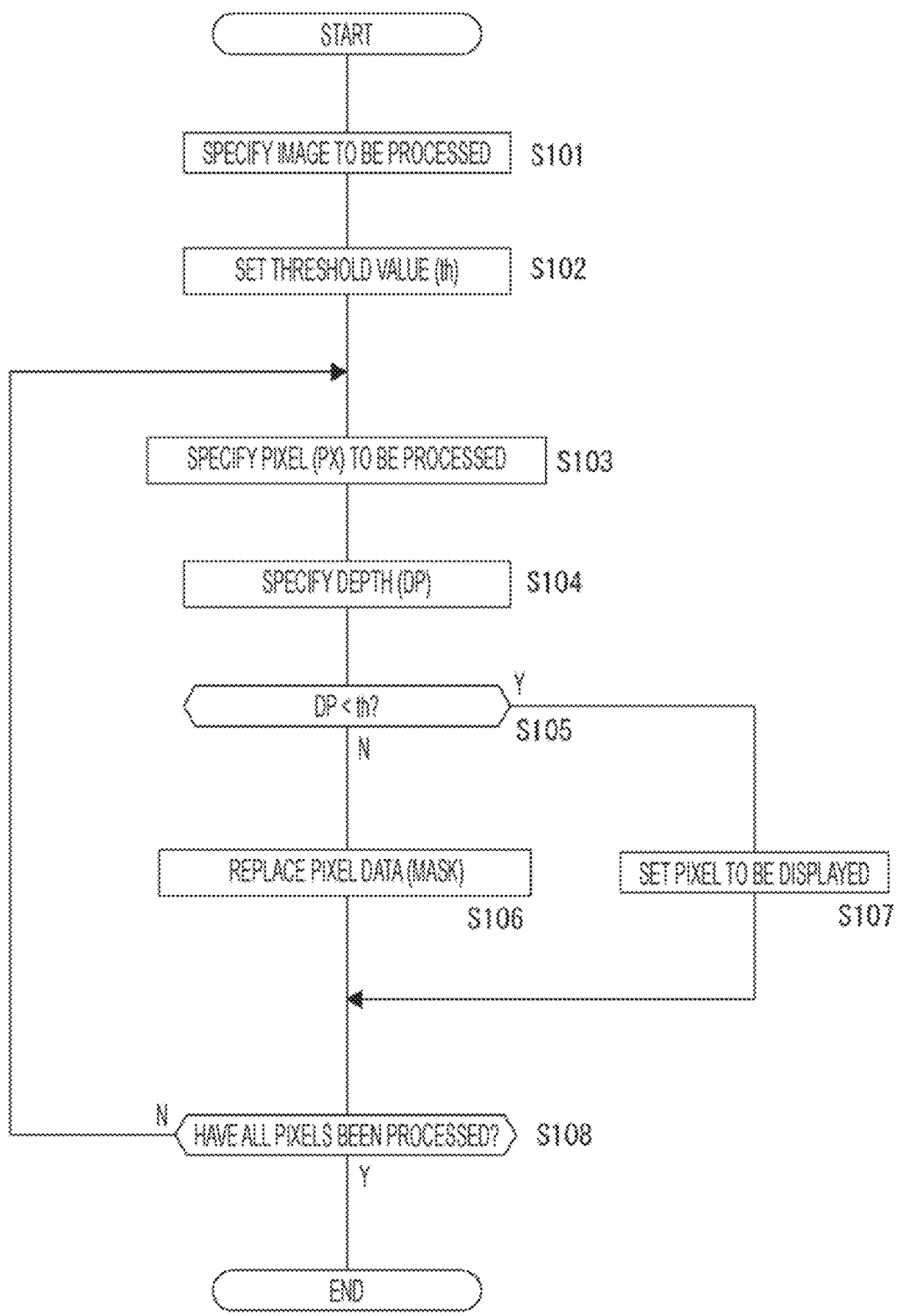
FIG. 7 is a flowchart illustrating an image editing process according to the first embodiment.

A processing example of the image processing device 1 is illustrated in FIG. 7. Incidentally, the process flow illustrated in FIG. 7 is a process flow which is performed by the CPU 51 illustrated in FIG. 4, which has the functions (mainly the functions of the reference depth setting unit 4 and the image editing processing unit 5) of the image processing device 1 illustrated in FIG. 1.

Incidentally, in the flowcharts of FIGS. 8, 12, 15, 17, 19, 23, 25, and 28 which will be described later, the process flows based on the functions of the image processing device 1 are illustrated similarly.

Further, in the flowcharts illustrated in the drawings, the same processes as in the previously mentioned flowcharts will be referred to by the same step numbers and description thereof will not be repeated.

The image processing device 1 specifies an image to be processed in step S101 in FIG. 7. For example, image data as illustrated in FIG. 5A and acquired by the image acquiring unit 2 is set as a processing object.

In step S102, the image processing device 1 (the reference depth setting unit 4) sets a threshold value th as reference depth information. That is, a value of a certain depth is set as the threshold value th. In this case, it is assumed that the image processing device 1 sets the value of the threshold value th on the basis of operation information input from the operation unit 10.

For example, the slider 110 illustrated in FIG. 2B is assumed to be an operator for setting the threshold value th. A user moves the slider 110 to an arbitrary position by a touch operation. By causing the position of the slider 110 to indicate the depth, a user can input an arbitrary depth.

Incidentally, various operation forms for designating the threshold value th can be thought. A user may touch a subject on the screen 102 such that a depth anterior to the subject is set as the threshold value th, or a user may input a numerical value as a depth.

When the threshold value th is set, the image processing device 1 sequentially selects each pixel PX of the image data to be edited as a processing object and compares the pixel with the threshold value th in step S103 or the steps subsequent thereto.

That is, the image processing device 1 (the image editing processing unit 5) specifies one pixel PX in step S103 and specifies depth information DP of the pixel PX in step S104.

Incidentally, the depth information DP0-0 to DPn-m of the pixels PX0-0 to PXn-m in the image data to be processed which is acquired by the image acquiring unit 2 are detected, for example, from the image data by the depth acquiring unit 3. The image editing processing unit 5 acquires the depth information DP of the corresponding pixel PX from the depth acquiring unit 3.

Further, when the depth information DP is added in the unit of a color pixel or a pixel block, one color pixel or one pixel block can be specified in step S103.

In step S105, the image processing device 1 (the image editing processing unit 5) compares the depth information DP of the corresponding pixel PX with the threshold value th.

When DP<th is satisfied, the pixel PX is a pixel of a subject on the nearer side than the depth which is the threshold value th. Therefore, in this case, in step S107, the image processing device 1 sets the pixel PX as a pixel to be displayed without any change in edited image data.

When DP<th is not satisfied, the pixel PX is a pixel of a subject on the deeper side than the depth which is the threshold value th. Therefore, in this case, in step S106, the image processing device 1 replaces the image data value of the pixel PX with another pixel data value in the edited image data. For example, the pixel value of the pixel PX is replaced with a specific pixel value which is used as mask data.

In step S108, the image processing device 1 checks whether or not the above-mentioned processes have been completely performed on all the pixels PX0-0 to PXn-m of the image data to be processed. When the processes have not been completely performed, the image processing device 1 specifies a pixel PX to be processed in the next in step S103 again and performs the processes of steps S104 to S107 thereon in a similar way.

At a time point at which it is determined in step S108 that the processes of steps S103 to S107 have been completely performed on all the pixels, edited image data as illustrated in FIG. 5B, which is obtained by trimming a subject on the nearer side than the virtual vertical plane VP1, is generated. That is, a trimming image based on a position of a subject at the time of capturing an image is embodied using the depth information DP.

The edited image data which is generated in this way is output from the image output unit 6 such that the edited image data is displayed on the display unit 11, is transmitted to an external device by the communication unit 12, or is stored in a storage medium by the storage unit 13.

In the example illustrated in FIG. 5B, an image in which the whole body of the subject H1 is cut is illustrated, but various representations are possible depending on the posture of a person of the subject H1 in the original image data or settings of the threshold value th, for example.

For example, an image in which only the front surface of the subject H1 is extracted, an image in which an upper half body is escaped from a wall when the subject H1 stoops down in the original image, or the like may be generated.

Incidentally, when step S107 is performed when DP>th is satisfied in step S105 and step S106 is performed when DP>th is not satisfied, a trimming image in which a subject on the deeper side than the virtual vertical plane VP1 is extracted is obtained.

Further, various pixel values which are used as mask data in step S106 are conceivable. Mask data is set to a luminance/color of pixels in the background of a subject to be trimmed, but may be set to a fixed value for expressing a predetermined luminance/color. Of course, the luminance or the color (a mask data value) may be selected by a user's operation.

Further, instead of a fixed value, it is also conceivable that a value which changes gradually depending on pixel positions to be a gradating background is used or a random value is used.

That is, various image representations are possible using the mask data value.

An example in which cutting of a subject is performed using a virtual horizontal plane/a virtual inclined plane as trimming will be described below.

Regarding the virtual vertical plane, trimming is performed as if the virtual vertical plane VP1 is present at a certain depth based on the threshold value th, but the plane serving as a trimming reference is not limited to a vertical plane and can be freely defined in a space.

For example, FIG. 6C illustrates a state in which a virtual horizontal plane VP2 is assumed to be in a space including the subjects H1, H2, and H3. Incidentally, in the drawing, it is assumed that a vertical plane VP2F in front of the virtual horizontal plane VP2 is a plane with a depth of 0 and a vertical plane VP2R in the rear thereof is a plane with a maximum depth.

Further, FIG. 6D illustrates a state in which a virtual inclined plane VP3 is assumed to be in the space including the subjects H1, H2, and H3.

When trimming with the virtual horizontal plane VP2 as a reference as illustrated in FIG. 6C is performed on the image illustrated in FIG. 5A, for example, edited image data in which an image above the virtual horizontal plane VP2 as illustrated in FIG. 5C is trimmed can be generated. Of course, edited image data in which an image below the virtual horizontal plane VP2 is trimmed may be generated depending on the processing.

Further, when trimming with the virtual inclined plane VP3 as a reference as illustrated in FIG. 6D is performed on the image illustrated in FIG. 5A, for example, edited image data in which an image above the virtual inclined plane VP3 as illustrated in FIG. 5D is trimmed can be generated. Of course, edited image data in which an image below the virtual inclined plane VP3 is trimmed may be generated depending on the processing.

As such an edited image, image representations such as an image in which a subject rises to the surface of water, an image in which a subject protrudes from a wall surface, an image in which a subject is buried in the ground surface, and an image in which a subject is submerged in water can be performed depending on, for example, a relationship between the cut subject and the background color or the background image other than the trimmed part.

Trimming with the virtual horizontal plane VP2 and the virtual inclined plane VP3 as a reference can be realized by setting the threshold value th.

In FIG. 7, first, one value is set as the threshold value th, but when a process of comparison with all the pixels PX0-0 to PXn-m is performed, trimming using the virtual vertical plane VP1 is realized. On the other hand, by setting the threshold value th for each pixel or for each area, trimming using the virtual horizontal plane VP2 or the virtual inclined plane VP3 can be realized.

A specific processing example will be described with reference to FIGS. 8, 9A, and 9B.

Figure 8:
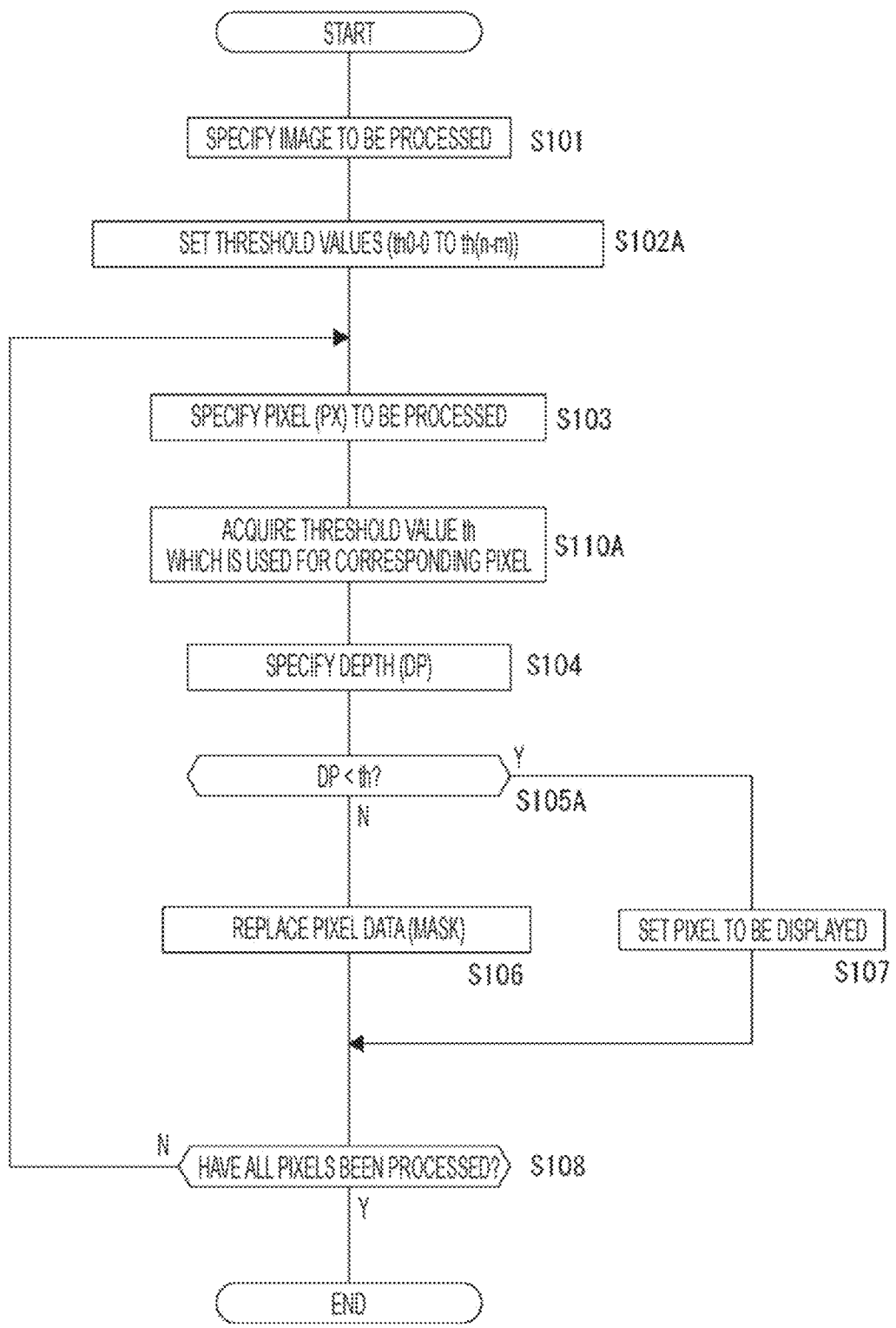
FIG. 8 is a flowchart illustrating another example of the image editing process according to the first embodiment.

When an image to be processed is specified in step S101 in FIG. 8, the image processing device 1 sets the threshold value th which is reference depth information in step S102A. In this case, the image processing device 1 sets a plurality of threshold values th0-0 to th(n-m) are set as the threshold value th to correspond to the pixels PX0-0 to PXn-m.

Figure 9:
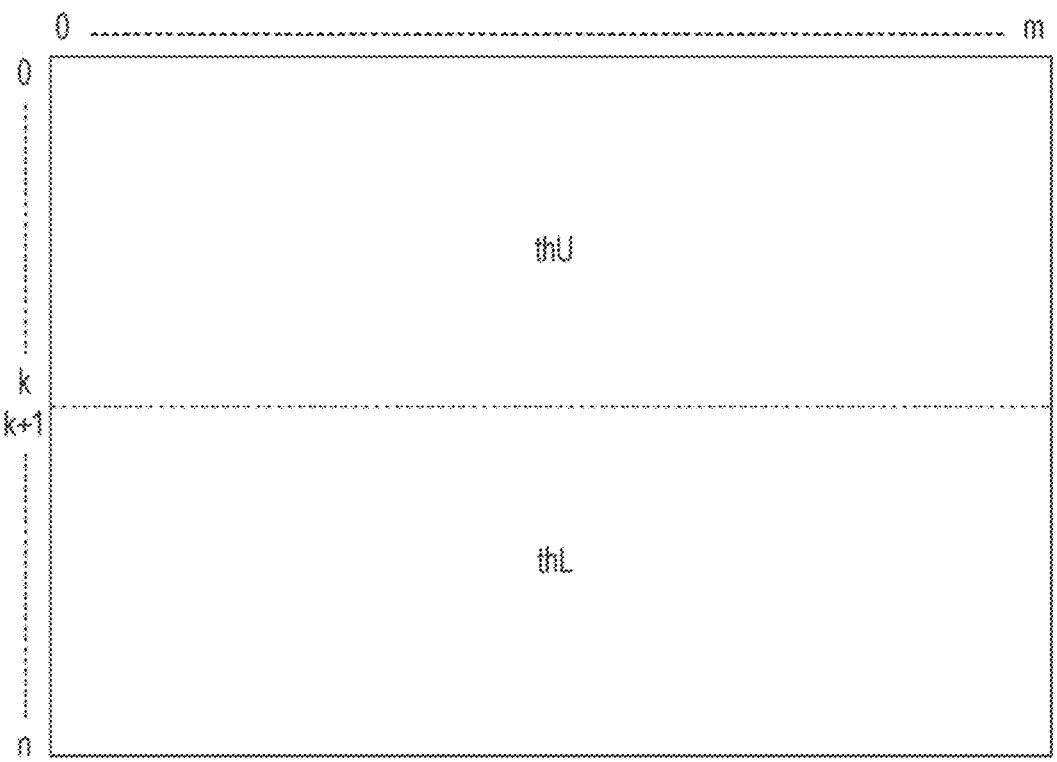
FIGS. 9A and 9B are diagrams describing an example in which a threshold value which is reference depth information is set for each pixel according to an embodiment.

FIG. 9A illustrates an example in which the threshold values th0-0 to th(n-m) corresponding to the pixels PX0-0 to PXn-m are set.

As will be described later, various virtual planes can be supposed depending on setting of the threshold values th0-0 to th(n-m) corresponding to the pixels PX0-0 to PXn-m.

When the threshold value th (the threshold values th0-0 to th (n-m) in this case) is set, the image processing device 1 specifies one pixel PX in step S103 and specifies the threshold value th corresponding to the pixel PX in step S110A. For example, when the pixel PX0-0 is first specified as a processing object, the threshold value th0-0 is specified among the threshold values th0-0 to th (n-m) set in step S102A.

In step S104, the image processing device 1 specifies depth information DP of the specified pixel PX. Then, in step S105A, the image processing device 1 compares the depth information DP of the pixel PX with the corresponding threshold value th (for example, the depth information DP of the pixel PX0-0 with the threshold value th0-0).

When DP<th is satisfied, the pixel PX is a pixel of a subject on the nearer side than the depth which is the threshold value th. Therefore, in this case, the image processing device 1 sets the pixel PX as a pixel to be displayed without any change in edited image data in step S107.

When DP<th is not satisfied, the pixel PX is a pixel of a subject on the deeper side than the depth which is the threshold value th. Therefore, in this case, the image processing device 1 replaces a pixel data value of the pixel PX with another pixel data value in the edited image data in step S106. For example, the pixel data value of the pixel PX is replaced with a specific pixel value which is used as mask data.

In step S108, the image processing device 1 checks whether or not the above-mentioned processes have been completely performed on all the pixels PX0-0 to PXn-m of the image data to be processed. When the processes have not been completely performed on all the pixels, the image processing device 1 specifies a pixel PX to be processed in the next time in step S103 and performs the processes of steps S110A to S107 similarly.

At a time point at which it is determined in step S108 that the processes of steps S103 to S107 have been completely performed on all the pixels, edited image data as illustrated in FIGS. 5C and 5D, which is obtained by trimming a subject on the upper side than the virtual horizontal plane VP2 or on the nearer side than the virtual inclined plane VP3, is generated.

The edited image data which is generated in this way is output from the image output unit 6 such that the edited image data is displayed on the display unit 11, is transmitted to an external device by the communication unit 12, or is stored in a storage medium by the storage unit 13.

In this processing example, trimming in which various virtual planes are supposed can be performed depending on setting of the threshold values th0-0 to th(n-m).

For example, when the virtual horizontal plane VP2 is set, the threshold values th0-0 to thk-m corresponding to the pixels PX0-0 to PXk-m in the zeroth row to the k-th row which are an upper half body of an image are set to the same value thU as illustrated in FIG. 9B. Further, the threshold values thk+1-0 to thn-m corresponding to the pixels PXk+1-0 to PXn-m in the (k+1)-th row to the n-th row which are, for example, a lower half body of an image are set to the same value thL.

In this case, when thU is set to a maximum depth value and thL is set to zero, the virtual horizontal plane VP2 illustrated in FIG. 6C can be set.

That is, the upper half of the image includes pixels on the nearer side than the threshold value th and thus remains as pixels in the edited image data. The lower half of the image includes pixels on the deeper side than the threshold value th and thus is masked. As a result, an edited image in which the image is cut by the virtual horizontal plane VP2 is generated.

A height position at which the virtual horizontal plane VP2 is disposed can also be arbitrarily set by setting the value of "k" in the k-th row in FIG. 9B.

For example, when the virtual horizontal plane VP2 is set, the image processing device 1 is supposed to set the value of k depending on operation information input from the operation unit 10.

For example, it is assumed that the slider 110 in FIG. 2B is an operator for setting the value of k. By moving the slider 110 to an arbitrary position, a user can designate what height position in an image the virtual horizontal plane VP2 is to be disposed.

Various operation forms for designating the value k can be thought. A user may touch a certain position on the screen 102 such that a height position thereof is set as the virtual horizontal plane VP2, or a user may input a numerical value as a height position.

Further, when the virtual inclined plane VP3 is set, the threshold values th of the pixels in the same row are set to the same value as illustrated in FIG. 10A.

For example, the threshold values th0-0 to th0-$m$ corresponding to the pixels PX0-0 to PX0-$m$ in the first row are set to the same value thR0. The threshold values th1-0 to th1-$m$ corresponding to the pixels PX1-0 to PX1-$m$ in the second row are set to the same value thR1. The threshold values thn-0 to thn-m corresponding to the pixels PXn-0 to PXn-m in the final row are set to the same value thRn.

In this case, by setting the value thR0 to a maximum depth value and setting the values thR1 to thRn to values of gradually decreasing depths, the virtual inclined plane VP3 illustrated in FIG. 6D can be set. In this case, the edited image data illustrated in FIG. 5D can be generated through the process flow illustrated in FIG. 8.

Incidentally, on the other hand, by setting the value thR0 to a minimum depth value and setting the values thR1 to thRn to values of gradually increasing depths, a virtual inclined plane which has an inclination direction opposite to that illustrated in FIG. 6D can be set. In this case, an edited image in which a nearer subject is more masked is generated through the process flow illustrated in FIG. 8.

At the time of setting such a virtual inclined plane VP3, a user can set an inclination angle.

For example, at the time of setting the virtual inclined plane VP3, the image processing device 1 can change the inclination angle by setting a difference in depth value between the rows from the value thR0 to the value thRn to vary such that the inclination angle is set on the basis of operation information input from the operation unit 10. By allowing the difference in depth value between the rows to be input as a positive or negative value, a user can also set the inclination direction.

In this case, the image processing device 1 can be configured to cope with a user's operation of the slider 110, a touch operation, an operation of inputting a numerical value of an inclination angle, and the like.

Furthermore, a virtual plane which is inclined horizontally in an image space is also conceivable as the virtual inclined plane. For example, the threshold values th of pixels in the same column are set to the same value as illustrated in FIG. 10B.

For example, the threshold values th0-0 to thn-0 corresponding to the pixels PX0-0 to PXn-0 in the first column are set to the same value thC0. The threshold values th0-1 to thn-1 corresponding to the pixels PX0-1 to PXn-1 in the second column are set to the same value thC1. The threshold values th0-$m$ to thn-m corresponding to the pixels PX0-$m$ to PXn-m in the final column are set to the same value thCm.

In this case, by setting the value thC0 to a maximum depth value and setting the values thC1 to thCn to values of gradually decreasing depths, a virtual inclined plane which extends from the left-deep side to the right-near side in the image can be set. In this case, an edited image in which right subjects are more masked is generated through the process flow illustrated in FIG. 8.

Further, by setting the value thC0 to a minimum depth value and setting the values thC1 to thCn to values of gradually increasing depths, a virtual inclined plane which extends from the left-near side to the right-deep side in the image can be set. In this case, an edited image in which left subjects are more masked is generated through the process flow illustrated in FIG. 8.

Also at the time of setting such a virtual inclined plane VP3, the image processing device 1 can allow a user to set the inclination angle in the horizontal direction by setting the values thC0 to thCm to correspond to the user's operation of the slider 110, a touch operation, an operation of inputting a numerical value of an inclination angle, and the like.

Incidentally, in step S105A of the process flow illustrated in FIG. 8, when step S107 is performed when DP>th is satisfied and step S106 is performed when DP>th is not satisfied, a trimming image in which a relationship of the cutting side with the virtual horizontal plane VP2 and the virtual inclined plane VP3 is inverted can be generated.

Further, similarly to the virtual vertical plane VP1, various pixels values which are used as mask data in step S106 can be considered.

Cutting of a subject in combination of extraction using a virtual plane with image recognition will be described below.

Figure 11:
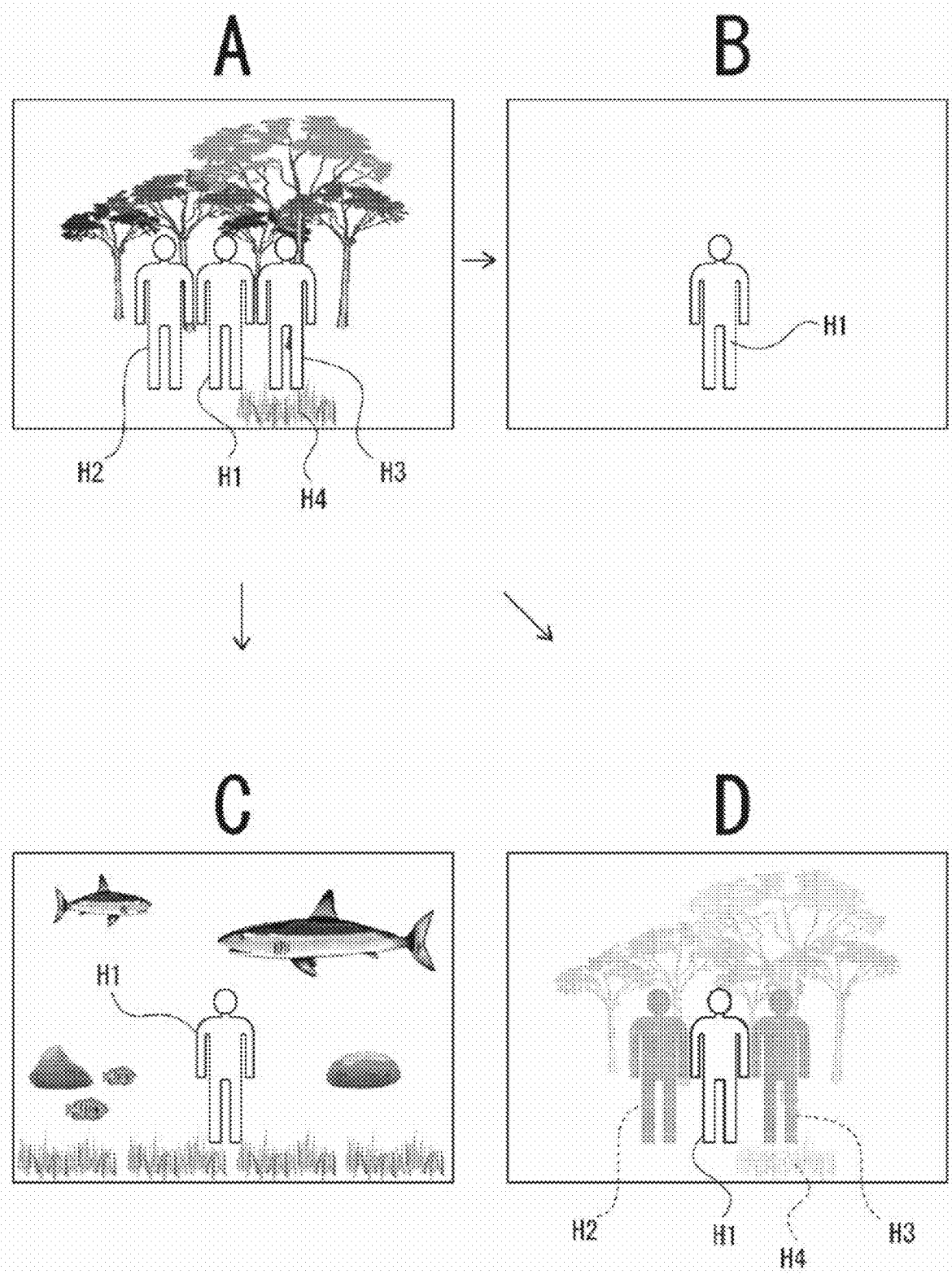
FIGS. 11A, 11B, 11C, and 11D are diagrams describing synthesis of a trimming image and another image according to the first embodiment.

FIG. 11A illustrates an original image which is set as a processing object. This is a still image in which three persons facing the front side are imaged as subjects H1, H2, and H3 and an ambient landscape appears before and after the persons.

Here, in the process flow illustrated in FIG. 7, it is assumed that the virtual vertical plane VP1 is supposed and trimming of the subject H1 which is a person on the nearest side is performed. As it is, in the image, it is assumed that a subject H4 is present on the nearer side than the subject H1. Then, the subject H4 is also included in a trimming image. In this case, for example, a process of recognizing an image area of a person by image analysis, or the like is performed and, for example, a trimming image in which only the subject H3 which is a person is cut as illustrated in FIG. 11B can be generated using the result of recognition.

Figure 12:
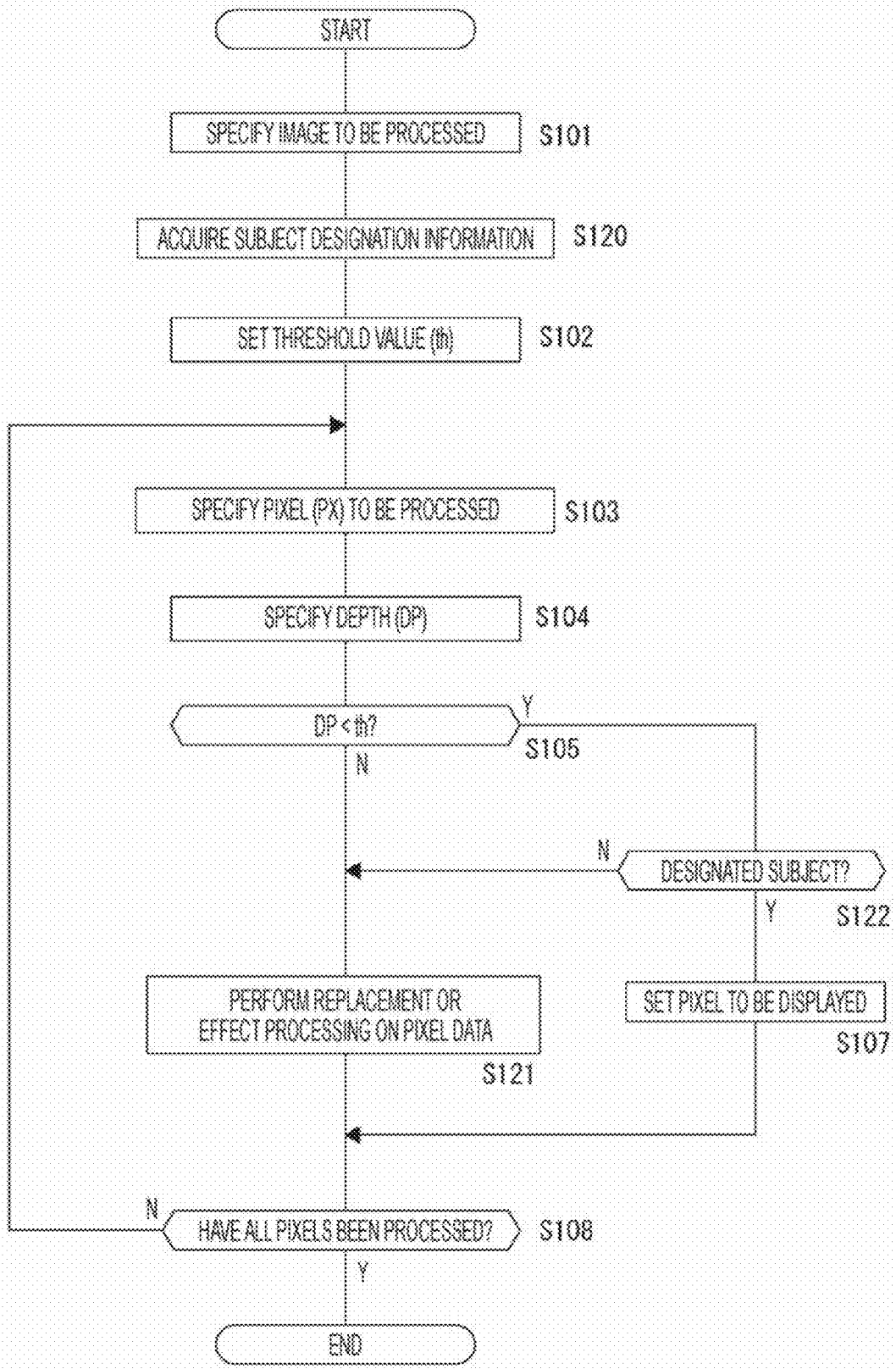
FIG. 12 is a flowchart illustrating another example of the image editing process according to the first embodiment.

FIG. 12 illustrates an example of a processing flow which is performed by the image processing device 1.

When an image to be processed is specified in step S101 in FIG. 12, the image processing device 1 acquires subject designation information in step S120.

For example, when the image as illustrated in FIG. 11A is an image to be processed, the image processing device 1 displays the image on the screen 102 illustrated in FIG. 2B and acquires a subject at a position on the screen 102 touched by a user as subject designation information.

It is assumed that the user touches an area of the subject H1. Then, the image processing device 1 (the image editing processing unit 5) acquires operation information thereof (information of the touched position).

The image editing processing unit 5 can perform image analysis on the image to be processed. For example, the image editing processing unit 5 can recognize a specific subject by person recognition, face recognition, or the like and determine a pixel area of the subject. When the specific subject (for example, a person) is determined by analysis, the image editing processing unit 5 presents the determined subject. For example, display for presenting the determined subject (such as display of a frame surrounding the part of the person) is performed on the screen 102. The user can designate one of recognized subjects by a touch operation. Then, for example, when information of the touched position is acquired and the position is within the area of the person determined in the person recognition or the like, the image editing processing unit 5 recognizes that the person is designated.

Alternatively, when the image to be processed is displayed and the information of the touched position is acquired, the image editing processing unit 5 may determine the outline of the pixels of the position in the image of the subject and recognize the area in the outline as the area of the designated subject.

In any way, a specific subject is designated by a user's operation or the like. Alternatively, a specific subject such as a person may be automatically designated regardless of a user's operation.

The image processing device 1 sets the threshold value th for supposing the virtual vertical plane VP1 in step S102, for example, in response to a user's operation.

Then, the processes of steps S103, S104, and S105 are performed in a way similar to that illustrated in FIG. 7.

In FIG. 12, the depth information DP of a pixel PX is compared with the threshold value th in step S105, and when DP<th is satisfied, it is checked in step S122 whether or not the pixel PX is a pixel of the subject designated in step S120. Then, when the pixel PX is a pixel of the designated subject, the pixel PX is set as a pixel to be displayed without any change in edited image data in step S107. On the other hand, when the pixel PX is not a pixel of the designated subject, the process flow transitions to step S121.

Further, when it is determined in step S105 that DP<th is not satisfied, the process flow also transitions to step S121.

In step S121, the image processing device 1 performs replacement or effect processing on pixel data of the pixel PX. For example, the pixel data is replaced with mask data in a way similar to that illustrated in FIG. 7.

These processes are repeated until it is determined in step S108 that the processes have been completely performed on all the pixels. Accordingly, more accurate trimming is possible.

For example, it is assumed that it is intended to trim only the subject H1 from the image illustrated in FIG. 11A using the virtual vertical plane VP1. In an edited image in which pixels on the nearer side than the virtual vertical plane VP1 are simply extracted, the subjects H1 and H4 remain. Through the process of step S122, the pixels of the subject H4 are replaced with mask data in step S121. Accordingly, a trimming image in which only the subject H1 is cut as illustrated in FIG. 11B can be generated. That is, image editing of accurately cutting only an object to be trimmed is possible.

In step S121, effect processing as well as replacement with mask data may be performed.

For example, a monochromatization process is performed. Then, as illustrated in FIG. 11D, an edited image in which only the subject H1 which is a person on the nearest side to be cut remains without any change as a color image and the other subjects are monochromatic images can be generated (a gray part in FIG. 11D is monochromatic).

That is, by combination with shape recognition, object recognition, color recognition, and the like, a process of leaving only a specific subject as a color image and not mixing another subject, which is located even at a position to be trimmed, with the color of the specific subject can be performed. Accordingly, trimming or effect processing capable of accurately distinguishing a specific subject from another subject can be performed.

The process of step S121 is not limited to the monochromatization process and change of atone, change of a luminance, a blurring process, mosaic processing, a multiple exposure process, or the like can also be considered. That is, editing of leaving only a specific subject by cutting based on depth information and changing a representation of another subject is possible.

Further, in step S121, a process of replacing a pixel value with a pixel value at a corresponding pixel position in a different image may be performed.

Then, an edited image in which the cut subject H1 appears in another background can be obtained. For example, an edited image in which the subject H1 is cut from the image illustrated in FIG. 11A and is disposed in another background as illustrated in FIG. 11C can be generated.

Incidentally, the trimming process using designation of a subject together as illustrated in FIG. 12 can be naturally applied to a case where the virtual horizontal plane VP2 or the virtual inclined plane VP3 is used. Furthermore, by applying image effect processing or replacement with a pixel value of another image in step S121 to a case where the virtual horizontal plane VP2 or the virtual inclined plane VP3 is used, various image representations are possible.

3. Second Embodiment

An example of an editing process of causing the image processing device 1 to naturally mix graphical effects with a space using depth information will be described as a second embodiment.

Here, it is assumed that characters or graphics having no depth are synthesized with an image having a depth. That is, when characters or graphics are added to a captured image, more natural representation can be realized by adjusting overlap with a subject or the like using depth information.

An example of a captured image which is set as a processing object (a first image) is illustrated in FIG. 13A. This is an image similar to that illustrated in FIG. 5A.

For example, FIG. 13B illustrates "ABCDE" in a certain font as an example of characters/graphics which are inserted as a second image into the first image.

Characters/graphics illustrated in FIG. 13B are synthesized with the image illustrated in FIG. 13A. In this case, a threshold value thI indicating an insertion depth is set as reference depth information. The threshold value thI as an insertion depth is a value of a depth at which characters/graphics are inserted into the image illustrated in FIG. 13A.

For example, the threshold value thI is set as a value which is on the deeper side than the subject H1 and on the nearer side than the subject H2. As illustrated in FIG. 13C, an insertion area IA is determined at the insertion depth.

Then, characters/graphics "ABCDE" is synthesized to be inserted into the insertion area IA.

As a result, a synthetic image as illustrated in FIG. 13D is generated. Since the insertion area IA is a position of the threshold value thI as the insertion depth and is located on the deeper side than the subject H1, a part of "ABODE" is hidden behind the subject H1.

Further, FIG. 14A illustrates an example of a captured image which is set as a processing object in a way similar to that illustrated in FIG. 13A.

For example, FIG. 14B illustrates five heart marks as an example of characters/graphics to be inserted. For example, FIG. 14B is an example of graphics which are prepared by computer graphics (CG).

The characters/graphics illustrated in FIG. 14B are synthesized with the image illustrated in FIG. 14A. In this case, threshold values thI1 to thI5 indicating insertion depths of the five heart marks are set as reference depth information. Further, as illustrated in FIG. 14C, insertion areas IA1 to IA5 of the heart marks are set. The insertion areas IA1 to IA5 are areas of depths indicated by the threshold values thI1 to thI5.

In this case, the threshold value thI1 is set to a depth on the nearer side than the subject H1, the threshold value thI2 is set to a depth on the deeper side than the subject H1 and on the nearer side than the subject H2, the threshold value thI3 is set to a depth on the deeper side than the subject H2 and on the nearer side than the subject H3, and the threshold values thI4 and thI5 are set to depths on the deeper side than the subject H3.

In addition, the characters/graphics of the five heart marks are synthesized to be inserted into the insertion areas IA1 to IA5, respectively.

As a result, a synthetic image as illustrated in FIG. 14D is generated. The heart marks are images which are visible or invisible depending on the anteroposterior relationships with the subjects H1, H2, and H3 such that they are located at the positions of the depths set as the threshold values thI1 to thI5.

Figure 15:
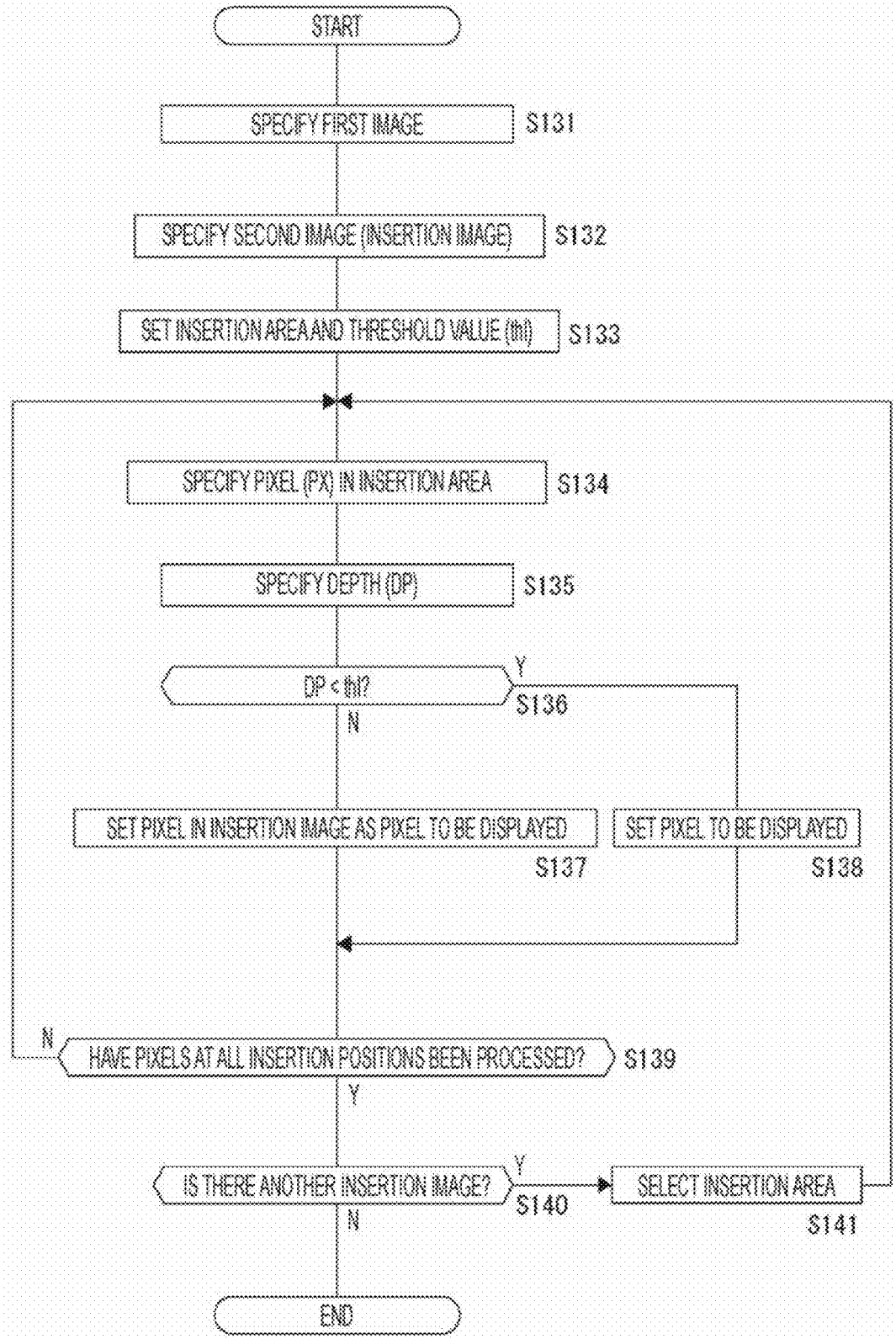
FIG. 15 is a flowchart illustrating an image editing process according to the second embodiment.

An example of a process flow for realizing such an editing process is illustrated in FIG. 15.

The image processing device 1 specifies a first image to be processed in step S131 of FIG. 15. For example, image data as illustrated in FIG. 13A or 14A, which is acquired by the image acquiring unit 2, is set as a processing object.

In step S132, the image processing device 1 specifies a second image (an insertion image) which is inserted into the first image. For example, the second image is characters/graphics illustrated in FIG. 13B or 14B.

Specification of the first and second images is performed in response to a user's designation of an image.

In step S133, the image processing device 1 sets an insertion area IA into which the second image (an insertion image) is inserted on the first image, and sets a threshold value thI as reference depth information.

For example, one insertion area IA and a threshold value thI as an insertion depth thereof are set as illustrated in FIG. 13C. Alternatively, a plurality of insertion areas IA1 to IA5 and threshold values thI1 to thI5 as insertion depths thereof are set as illustrated in FIG. 14C.

This setting can be determined, for example, on the basis of a position on the first image designated by a user.

For example, the setting is performed such that characters/graphics are inserted immediately before a subject at the position on the first image designated by the user.

For example, when a user designates a position on the subject H2 in the first image illustrated in FIG. 13A, the insertion area IA of the second image in FIG. 13B is disposed on the nearer side than the subject H2.

In FIG. 14B, when a user designates a position on the subject H1 in the first image, an insertion area IA1 of one leading heart mark is set at a depth (a threshold thI1) on the nearer side than the subject H1, and threshold values thI2 to thI5 which are depths corresponding to sizes (for example, depths which gradually become deeper) are set for the rest four insertion areas IA2 to IA5.

Incidentally, the insertion areas IA and the threshold values thI are not designated by a user but may be automatically set by the image processing device 1.

In step S134 and the steps subsequent thereto, the image processing device 1 sequentially compares each pixel PX included in the insertion area IA with the threshold value thI in image data of the first image.

That is, the image processing device 1 specifies one pixel PX in an area which is a certain insertion area IA in the first image in step S134 and specifies depth information DP of the pixel PX in step S135.

Incidentally, here, when the number of set insertion areas IA is one, one pixel in the insertion area IA is naturally specified as a processing object.

When the number of set insertion areas IA is two or more (for example, there are insertion areas IA1 to IA5), for example, one pixel in the first insertion area IA1 is specified as a processing object.

In step S136, the image processing device 1 compares the depth information DP of a pixel PX to be processed with the threshold value thI set for the insertion area IA including the pixel PX.

When DP<thI is satisfied, the pixel PX in the first image is a pixel of a subject on the nearer side than the depth which is the threshold value thI. Therefore, in step S138, the image processing device 1 sets the pixel PX as a pixel to be displayed without any change in edited image data.

When DP<thI is not satisfied, the pixel PX in the first image is a pixel of a subject on the deeper side than the depth which is the threshold value thI. Therefore, in this case, in step S137, the image processing device 1 replaces the image data value of the pixel PX in the edited image data with a pixel data value corresponding to the pixel position in the second image (an insertion image). That is, the pixel data of the second image is set as a pixel to be displayed.

In step S139, the image processing device 1 checks whether or not the above-mentioned processes have been completely performed on all the pixels in the first image in the area serving as the insertion area IA. When the processes have not been completely performed, the image processing device 1 specifies a pixel PX to be processed in the next time in the insertion area IA which is being currently processed in step S134 again and performs the processes of steps S135 to S138 in a similar way.

When it is determined in step S139 that the processes of steps S134 to S138 have been completely performed on all the pixels in one insertion area IA, the image processing device 1 checks whether or not another set insertion area IA remains in step S140.

When one insertion area IA is set as illustrated in FIG. 13C, the process flow ends.

When a plurality of insertion areas IA1 to IA5 are set as illustrated in FIG. 14C and there is a non-processed insertion area IA, a next insertion area IA (for example, the insertion area IA2) is selected in step S141, and the processes of steps S134 to S139 are performed on the insertion area IA. At a time point at which it has been checked in step S140 that the processes have been completely performed on all the insertion areas IA, the process flow illustrated in FIG. 15 ends.

At the time point at which the process flow illustrated in FIG. 15 has ended, for example, edited image data as illustrated in FIG. 13D or 14D is generated.

The edited image data which is generated in this way is output from the image output unit 6 such that the edited image data is displayed on the display unit 11, is transmitted to an external device by the communication unit 12, or is stored in a storage medium by the storage unit 13.

In the example of the process flow illustrated in FIG. 15, characters/graphics as the second image are inserted into the first image at a predetermined depth, and a synthetic image in which the characters/graphics have seemed to actually exist in a subject space is realized.

That is, by adjusting overlap using depth information, it is possible to enable image representation in which a graphical effect is naturally mixed with a subject space.

Incidentally, by applying an image effect as well as the anteroposterior relationship depending on a depth, it is possible to enable image representation which is more natural.

The image illustrated in FIG. 16A is set as the first image in which three subjects H1, H2, and H3 appear.

Here, it is assumed that second images G1 and G2 of characters "ABCD" are inserted with the depth relationship illustrated in FIG. 16B.

The depth of the second image G1 is set between the subjects H1 and H2, and the depth of another second image G2 is set between the subjects H2 and H3.

An edited image in which the second images G1 and G2 are inserted in such an arrangement state in the depth direction and then image processing expressing a sense of blurring in the depth direction is further performed is illustrated in FIG. 16C.

In this way, by adding a sense of blurring to the second images G1 and G2 similarly to a natural sense of blurring of the first image, a synthetic image in which even an image originally having no depth such as characters/graphics is naturally mixed with the first image can be obtained.

Figure 17:
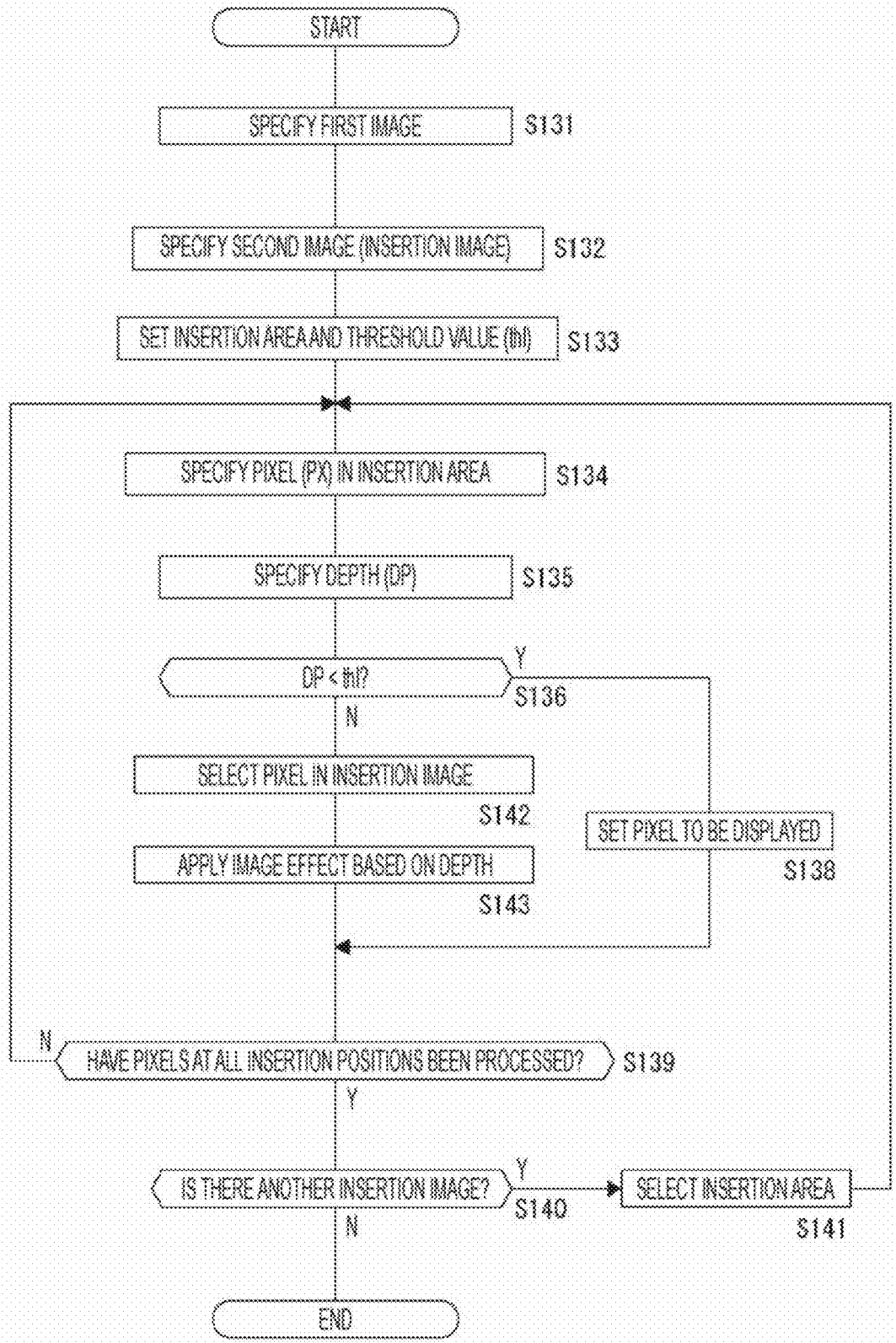
FIG. 17 is a flowchart illustrating an image editing process according to the modified example of the second embodiment.

An example of the process flow is illustrated in FIG. 17. In FIG. 17, step S137 in the example of the process flow illustrated in FIG. 15 is changed to steps S142 and S143. The processes of steps S131 to S136 are similar to those in FIG. 15.

In step S136, the image processing device 1 compares depth information DP of a pixel PX to be processed with a threshold value thI set for an insertion area IA including the pixel PX.

When DP<thI is satisfied, the pixel PX in the first image is a pixel of a subject on the nearer side than the depth which is the threshold value thI and thus the pixel PX is set as a pixel to be displayed without any change in edited image data in step S138.

When DP<thI is not satisfied, the pixel PX in the first image is a pixel of a subject on the deeper side than the depth which is the threshold value thI. Therefore, in this case, the image processing device 1 replaces a pixel data value of the pixel PX in edited image data with a pixel data value corresponding to the pixel position thereof in the second image (an insertion image) in step S142. That is, pixel data of the second image is selected.

Then, in step S143, an image effect corresponding to the depth (that is, the set value of the threshold value thI) is applied to the pixel data of the second image. For example, a process of decreasing a luminance value to correspond to the depth position or giving a sense of blurring is performed.

Steps S139, S140, and S141 are similar to those in FIG. 15.

Incidentally, the image effect processing of step S143 may be suitably performed on the range of the second image at a time point after step S139 in which pixels of the second image have been arranged in the insertion area IA depending on the type of the image effect.

Through the above-mentioned processes, characters/graphics having no depth as the second image can be synthesized in a state in which an image effect corresponding to the insertion position into the first image has been given, and a synthetic image matching much with the first image, that is, a synthetic image in which characters/graphics have seemed to actually exist at the time of capturing the first image, can be generated.

Here, an example in which characters/graphics are synthesized has been described, but, for example, when a natural phenomenon such as mist, cloud, or flare is synthesized with an image, natural representation including gradation or the like in addition to overlap with a subject in the first image can be realized using the depth information.

For example, by using images of suspended particles such as snow or raindrops as the second image, the suspended particles are also reflected depending on the insertion positions and the depth information DP of the pixels of the first image. Further, gradation corresponding to the depth is set. Accordingly, it is possible to generate a synthetic image as a more natural scene.

Further, even when shade, light beams, shadow of a subject, and the like due to virtual illumination light are synthesized as the second image, they can be appropriately expressed depending on the depth thereof.

4. Third Embodiment

An example of an editing process of causing the image processing device 1 to apply an image effect using depth information will be described as a third embodiment.

That is, an image effect such as an optical effect based on a depth is applied to a subject of an image which is set as a processing object.

An original image to be processed is an image similar to that illustrated in FIG. 5A.

FIG. 18A illustrates an arrangement relationship between subjects H1, H2, and H3 at the time of capturing an image to be processed. The subjects H1, H2, and H3 are sequentially arranged from the near side.

In this case, a state in which a plurality of membranes E seem to exist is supposed as illustrated in FIG. 18B and an edited image which becomes vaguer toward the deeper side is generated by the plurality of membranes E as illustrated in FIG. 18C. In other words, an image in which the subjects H1, H2, and H3 stand in the mist is generated.

For example, by setting an effect level depending on the depth of a subject at the time of applying an image effect, image effect representation based on a depth position of a subject can be realized as in this example.

For example, when an image effect process of applying an effect such as mist or rain is performed, an image which may be called optical weather phenomenon emulation can be generated by changing the density or concentration thereof depending on the depths of subjects.

Figure 19:
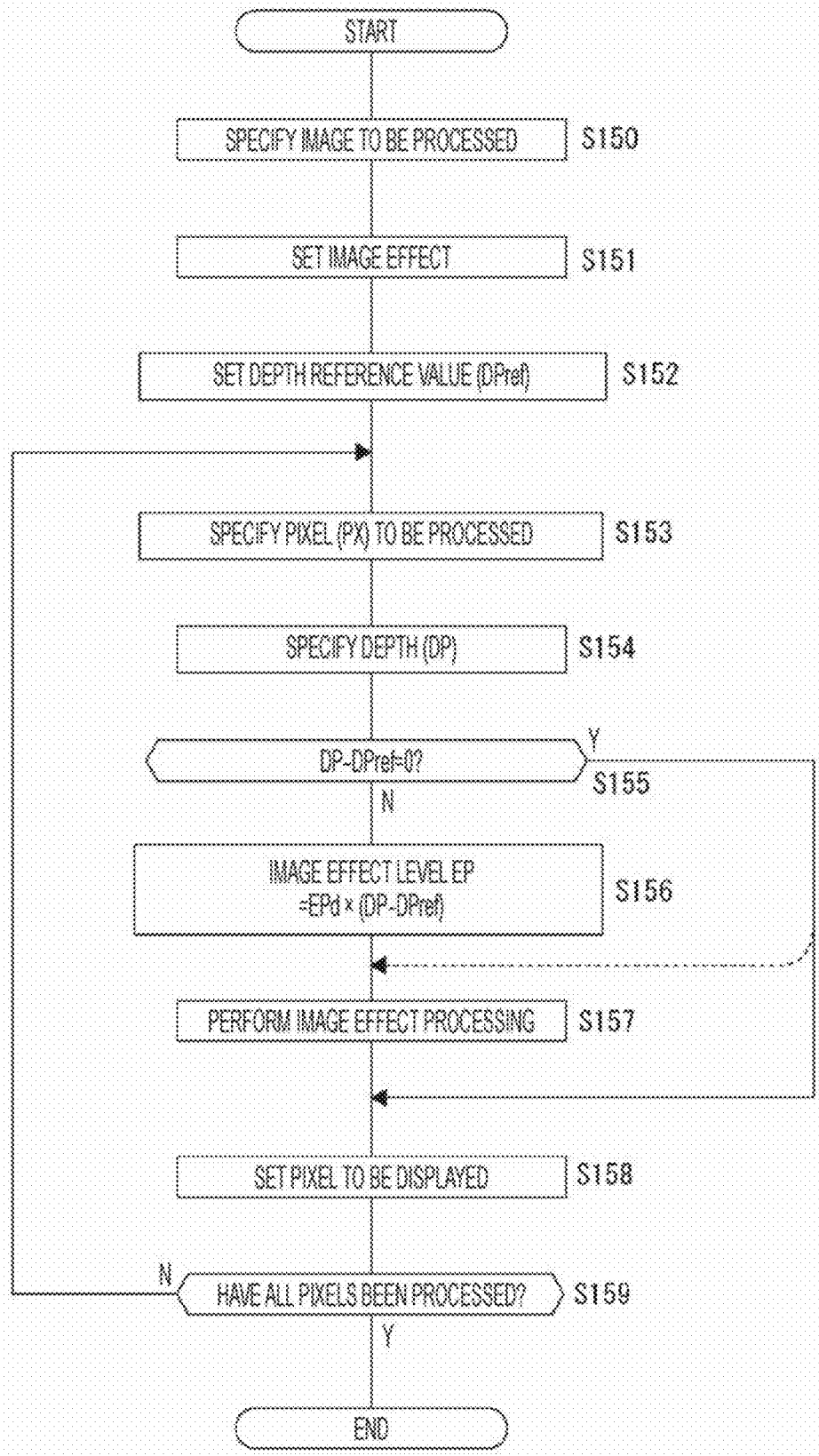
FIG. 19 is a flowchart illustrating an image editing process according to the third embodiment.

An example of the process flow is illustrated in FIG. 19.

In step S150 of FIG. 19, the image processing device 1 specifies an image to be processed. For example, image data as illustrated in FIG. 5A, which is image data acquired by the image acquiring unit 2, is specified as a processing object.

In step S151, the image processing device 1 sets an image effect which is applied to the image to be processed. That is, what type of image effect is to be applied is set. Actually, the type of image effect can be selected by a user's operation.

In step S152, the image processing device 1 sets a depth reference value DPref as reference depth information.

The depth reference value DPref represents a depth serving as a reference of an image effect level (strength of an effect).

Figure 20:
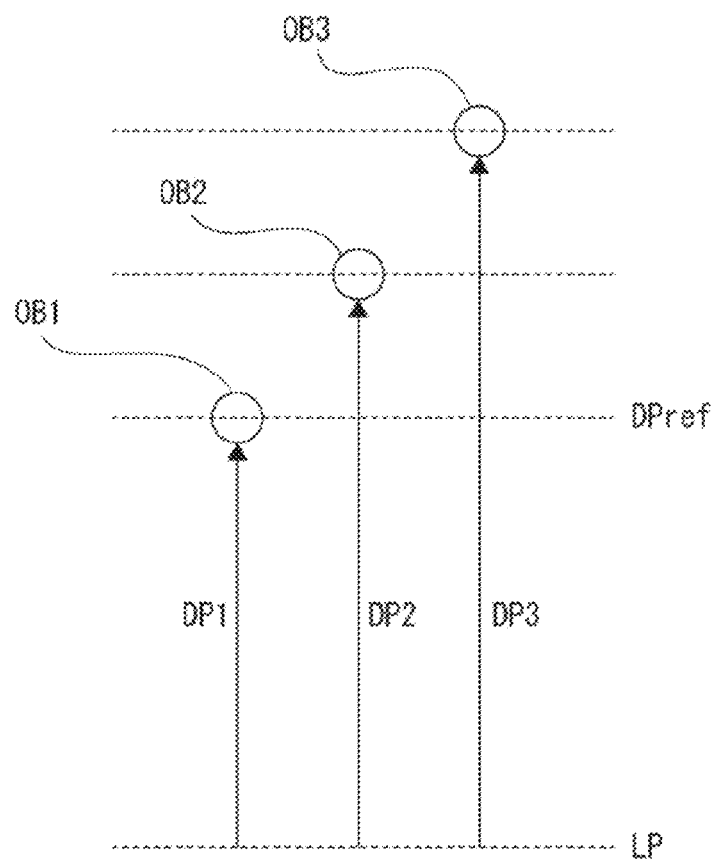
FIG. 20 is a diagram describing effect processing according to the third embodiment.

For example, FIG. 20 illustrates an example in which a lens plane of a camera at the time of capturing an image to be processed is defined as a position LP and a certain depth position is set as the depth reference value DPref.

The depth of the depth reference value DPref may be set to, for example, a focal distance of the camera, or the like, or may be set to a depth which is selected by a user's operation. A certain depth is used as a reference depth of an image effect level.

In step S153 or steps subsequent thereto, the image processing device 1 sequentially processes pixels PX in image data to be processed.

That is, the image processing device 1 specifies one pixel PX in step S153 and specifies depth information DP of the pixel PX in step S154.

In step S155, the image processing device 1 calculates a difference (DP–DPref) between the depth information DP of the pixel PX to be processed and the depth reference value DPref.

When the difference (DP–DPref)=0 is not satisfied, the image processing device 1 sets an image effect level EP corresponding to the difference in step S156.

For example, an initial value EPd of the image effect level is multiplied by the difference (DP–DPref) to calculate the image effect level EP.

Then, in step S157, image effect processing is performed using the image effect level EP. For example, when an effect of mist is given to an image, the concentration of the mist is set to the image effect level EP.

Then, in step S158, a pixel value on which the image effect processing has been performed is set as pixel data which is used for an edited image.

When the difference (DP–DPref)=0 is satisfied in step S155, the image processing device 1 sets the pixel PX as a pixel to be displayed without any change in edited image data in step S158. That is, image effect processing is not performed on the pixel.

In this case, however, such a type of image effect processing in which the image effect level of a pixel corresponding to the depth reference value DPref is set to zero is selected.

When such a type of image effect processing in which the image effect level of the pixel corresponding to the depth reference value DPref is set to an initial value EPd other than zero is selected and the difference (DP–DPref)=0 is satisfied, the image effect processing is performed using the initial value EPd in step S157 as indicated by a dotted line in FIG. 19. Then, in step S158, a pixel value to which the image effect processing has been performed is set as pixel data which is used for an edited image.

In the example illustrated in FIG. 20, subjects OB1, OB2, and OB3 are illustrated at depths from the lens plane LP, and the depths are DP1, DP2, and DP3, respectively. Then, in this example, the depth reference value DPref is set to DP1.

In this case, for example, the pixels of the subject OB1 are not subjected to image effect processing or are subjected to image effect processing using an initial value.

The subject OB2 is subjected to image effect processing at a level of an initial value EPd×a difference (DP2–DPref).

The subject OB3 is subjected to image effect processing at a level of an initial value EPd×a difference (DP3–DPref).

When the depths of the subjects OB1, OB2, and OB3 correspond to the subjects H1, H2, and H3 in FIG. 18A, for example, as illustrated in FIG. 18C, an edited image in which image effect processing of causing the subject H1 to be clear and causing the subjects H2 and H3 on the deeper side to become vaguer is realized.

In step S159 of FIG. 19, the image processing device 1 checks whether or not the above-mentioned processes have been completely performed on all the pixels in the image to be processed. When the processes have not been completely performed, the image processing device 1 specifies a pixel PX to be processed in the next time in step S153 again and performs the processes of steps S154 to S158 in a similar way.

At a time point at which it is determined in step S159 that the processes of steps S153 to S158 have been completely performed on all the pixels, the process flow illustrated in FIG. 19 ends.

At the time point at which the process flow illustrated in FIG. 19 has ended, for example, the edited image data as illustrated in FIG. 18C is generated. The edited image data which is generated in this way is output from the image output unit 6 such that the edited image data is displayed on the display unit 11, is transmitted to an external device by the communication unit 12, or is stored in a storage medium by the storage unit 13.

Through the example of the process flow illustrated in FIG. 19, for example, an edited image in which background blurring due to a point light source or the like is freely changed on the basis of depth information of a subject or a color or a shape is changed can be generated.

Further, appropriate representation of light may be performed by changing amount, intensity, angle, color, or the like of light in consideration of a shape or a texture of a wall or a floor in addition to a depth, for example.

Further, when an image effect of disposing a virtual light source in a space of an image is considered, an image in which highlight or shadow is changed by changing a position or intensity of a lighting can also be generated. For example, an image to be processed is simulated in a three-dimensional space using a depth DP and a three-dimensional position of a light source for virtual lighting is set in the space. In this case, by setting the depth position of the light source to the depth reference value DPref, an influence (a luminance or shadow) of lighting from the light source on each subject can be calculated. That is, a lighting effect can be set on the basis of the result of comparison between depth information of each pixel and the depth reference value DPref. Accordingly, an edited image which has seemed to be actually subjected to image effect processing of performing lighting from a virtual light source can be generated. Further, in this case, an edited image in which various lighting situations are expressed may be generated by allowing a user to arbitrarily set a position of a light source.

As described above, various image representations are possible by applying an image effect corresponding to a depth of a subject to an image to be processed.

5. Fourth Embodiment

An example of an editing process of causing the image processing device 1 to overlap different images having depth information will be described as a fourth embodiment.

This is an example in which natural overlap or an image effect corresponding to a depth of a subject is performed on a plurality of images having depths.

A first image and a second image are supposed as processing objects. It is assumed that both are, for example, captured images.

The first image is defined as an image into which another is inserted, and the second image is defined as an image of a subject which is inserted into another.

FIG. 21A illustrates the first image. The first image is a photograph in which a set of a plurality of persons appears. A hatched person is defined as a subject H10.

FIG. 21B illustrates the second image. The second image is a photograph of one person (a subject H20).

The subjects H10 and H20 have different image sizes (areas of pixel areas).

Here, it is assumed that the scale of the subject H20 is adjusted and then the subject H20 is synthesized into the oblique rear side of the subject H10 in the first image.

As illustrated in FIG. 21C, an insertion area IA which is on the oblique rear side of the subject H10 in the first image is set. Furthermore, the size of the subject H20 in the second image is decreased such that the same feeling of scale as the subject H10 is acquired as illustrated in FIG. 21D. Further, regarding a positional relationship therebetween, the subject H20 is present in the insertion area IA which is set on the oblique rear side of the subject H10.

FIG. 21E illustrates a synthetic edited image. The subject H20 has an anteroposterior relationship with the subject H10, is subjected to adjustment in size, and is inserted into the first image.

Figure 22:
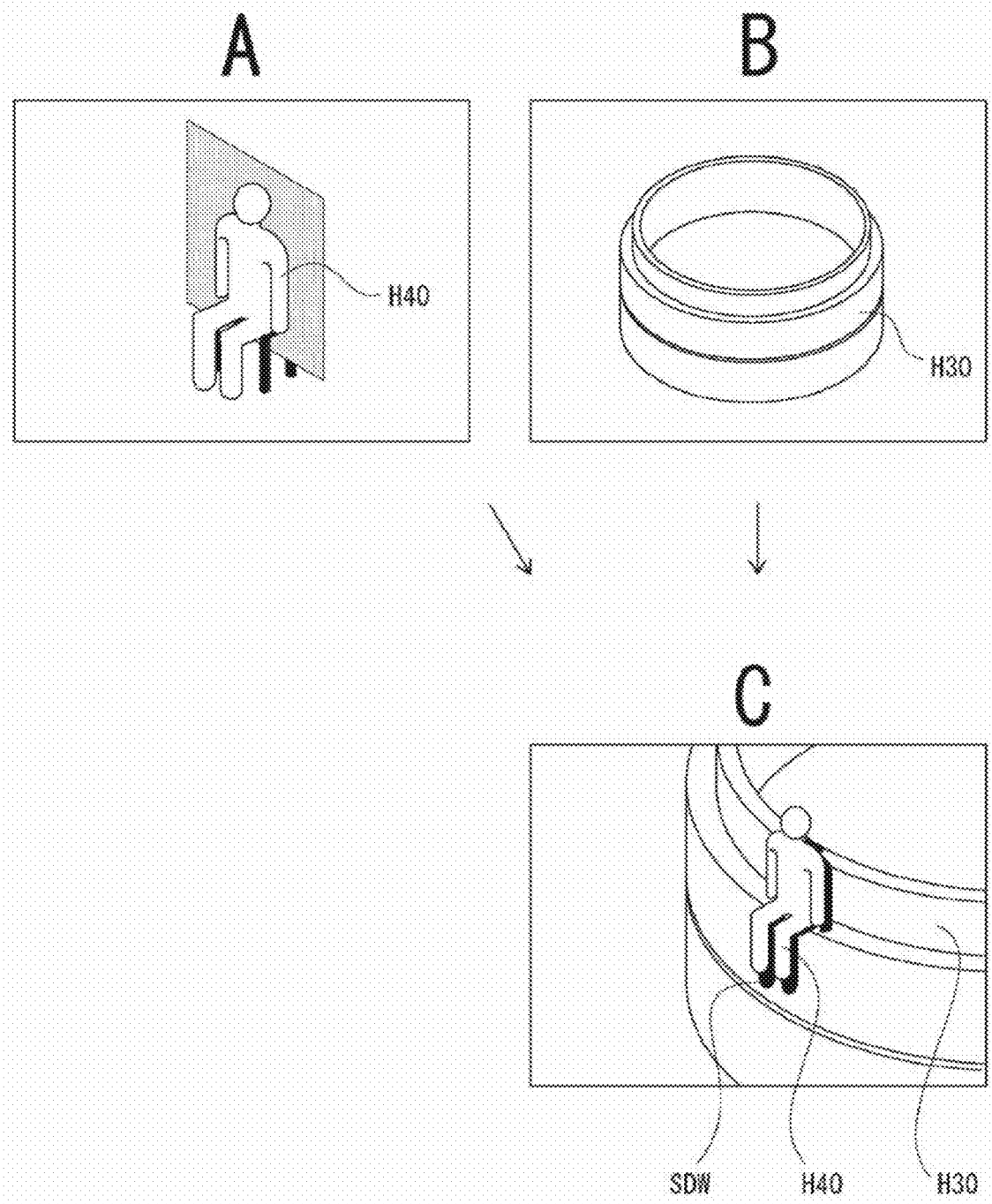
FIGS. 22A, 22B, and 22C is a are diagrams describing a synthetic image according to the fourth embodiment.

Further, FIG. 22A illustrates a second image (which is inserted into another) as a subject H40 which is trimmed from a certain image. FIG. 22B illustrates a first image (into which another is inserted) including a subject H30.

In this case, the size of the first image is changed and synthesis of disposing the subject H40 of the second image in the first image is performed to acquire an edited image illustrated in FIG. 22C.

In the edited image illustrated in FIG. 22C, image representation is performed such that the subject H40 of the second image which is a person in a sitting posture sits on a stepped portion of the subject H30 of a container which is the enlarged first image. That is, an image in which a synthetic position is set depending on the depths of pixels based on an actual three-dimensional shape of the subject H30 and depth information of pixels of the subject H40 in which a person is in a sitting posture is generated.

Figure 23:
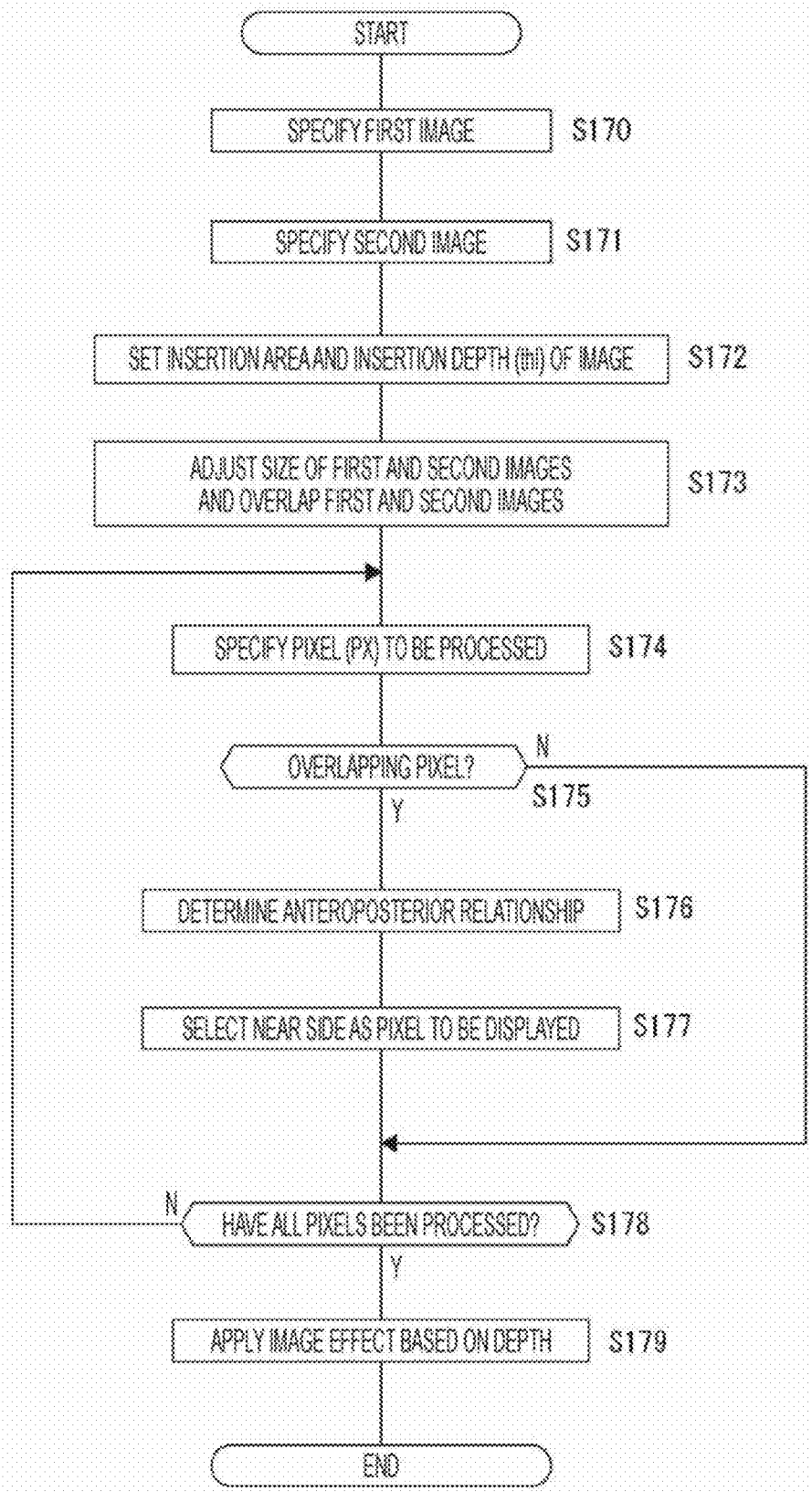
FIG. 23 is a flowchart illustrating an image editing process according to the fourth embodiment.

An example of a process flow for realizing such editing process is illustrated in FIG. 23.

The image processing device 1 specifies a first image to be processed in step S170 of FIG. 23. Further, in step S171, the image processing device 1 specifies a second image to be processed. Both the first image and the second image are image data which are acquired by the image acquiring unit 2, for example, in response to a user's image designation operation, and the like.

In step S172, the image processing device 1 sets an insertion area IA for synthesis of the first image and the second image and a threshold value thI serving as reference depth information (an insertion depth).

For example, as illustrated in FIG. 21C, an insertion area IA and a threshold value thI as an insertion depth thereof are set in the first image. These can be determined, for example, on the basis of a position in the first image designated by a user. Alternatively, the image processing device 1 may automatically set the insertion area IA and the insertion depth. For example, in FIG. 21C, a position and a depth at which the subject H20 can be inserted may be automatically determined and set.

Further, in the example illustrated in FIG. 22C, a user may set the insertion area IA and the threshold value thI as the insertion depth in the first image, or the image processing device 1 may automatically set the insertion area IA and the insertion depth from depths of pixels of the subjects H30 and H40.

In step S173, the image processing device 1 adjusts the size of one or both of the first image and the second image and temporarily overlaps the two images.

For example, the subject H20 in FIG. 21B is subjected to size adjustment such that it can be disposed in the insertion area IA of the first image. Then, the subject H20 of the second image is overlapped with the insertion area IA of the first image.

The image processing device 1 performs a process based on an overlap relationship with the second image on all the pixels of the image data of the first image into which the subject is inserted in step S174 and the steps subsequent thereto.

That is, the image processing device 1 specifies one pixel PX of the first image in step S174 and determines whether or not the pixel PX is a pixel overlapping an insertion subject of the second image (for example, the subject H20) in step S175.

When the pixel PX is not an overlapping pixel, the process flow returns to step S174 via step S178 and a next pixel is processed.

When a certain pixel PX is a pixel overlapping the subject of the second image, the process flow transitions from step S175 to step S176 and the image processing device 1 determines an anteroposterior relationship. The second image is inserted at an insertion depth indicated by the threshold value thI.

Accordingly, in step S176, the image processing device 1 acquires depth information of the pixel PX and compares the depth DP with the threshold value thI.

When DP>thI is satisfied, a pixel of the first image is on the nearer side.

When DP>thI is not satisfied, it is determined that a pixel of the second image is on the nearer side.

However, all the pixels of the subject H20 as the second image do not have the same depth. More accurately, the depths of the pixels of the subject H20 have different values. Therefore, it is preferable that the threshold value thI as an insertion depth be set, for example, to the nearest position in the subject H20, or the like, and the value DPs of the depth of a pixel located on the nearest side among the pixels of the subject H20 be set as the insertion depth (the threshold value thI).

For example, when the value of the depth information DP added to each pixel of the subject H20 of the second image is defined as "DPx", comparison is performed on the basis of the depth DPx of the pixel. That is, when DP>thI+(DPx−DPs) is satisfied, a pixel of the first image is on the nearer side.

When DP>thI+(DPx−DPs) is not satisfied, it is determined that a pixel of the second image is on the nearer side.

In this way, actual depth information of the pixels of the second image is reflected in the threshold value thI which is an insertion depth and the anteroposterior relationship between a pixel of the first image and a pixel of the second image is ascertained.

Then, the image processing device 1 selects the nearer pixel as a pixel to be displayed in step S177.

Accordingly, one pixel is selected such that a nearer part is displayed when the first image and the second image are overlapped.

In step S178, the image processing device 1 checks whether or not the above-mentioned processes have been completely performed on all the pixels of the first image. When the processes have not been completely performed, a pixel PX to be processed in the next time is specified in step S174 again and the processes of steps S175 to S177 are performed in a similar way.

When it is determined in step S178 that the processes of steps S174 to S177 have been completely performed on all the pixels of the first image, the image processing device 1 causes the process flow to transition from step S178 to step S179.

Step S179 may not be necessarily performed, but the image processing device 1 performs image effect processing based on the depth of the synthesized image herein.

For example, a shadow which is generated by inserting the subject as the second image into the first image is added, or blurring based on the insertion depth thereof is performed on the second image.

FIG. 22C illustrates an example in which image effect processing of causing a shadow SDW of the subject H40 of the second image to appear on the first image is performed.

At the time point at which the process flow illustrated in FIG. 23 has ended, for example, the edited image data as illustrated in FIGS. 21E and 22C is generated.

The edited image data which is generated in this way is output from the image output unit 6 such that the edited image data is displayed on the display unit 11, is transmitted to an external device by the communication unit 12, or is stored in a storage medium by the storage unit 13.

In the example of the process flow illustrated in FIG. 15, the subject as the second image is inserted into the first image at a predetermined depth. Further, adjustment of the size of the subject at the time of insertion is also performed. Accordingly, a synthetic image in which the subject of the second image seems to exist in the space of the first image at the time of actually capturing the first image is realized.

Further, when the image effect processing based on the insertion depth of the second image is performed, more natural synthesis is possible.

The size adjustment may be performed with a size relationship matching the reality, for example, as illustrated in FIG. 21E or with a size relationship not matching the reality as illustrated in FIG. 22C. For example, a synthetic image in which the size of a person image (the second image) relative to a normal background image (the first image) is changed to a size which is not actually based on a ratio to the background can also be generated.

Accordingly, freer image representation is possible.

Further, when the second image is a subject H40 which is trimmed from an original image as illustrated in FIG. 22A, the degree of freedom of an area overlapping the first image increases or the number of pixels PX which are determined to be overlap pixels in step S175 decreases and thus a processing load in FIG. 23 can be reduced.

Incidentally, an example in which the size of one of the first image and the second image is adjusted has been described, but the sizes of both the first image and the second image may be adjusted.

Further, the first image and the second image are images having depth information, but are not limited to actually captured images. For example, one or both of the first image and the second image may be 3D graphic images having depth information of a subject or pixels. For example, when FIG. 22A is an actually captured image and FIG. 22B is a 3D graphic image, it is also supposed that the synthetic image as illustrated in FIG. 22C is generated using the depth information thereof.

6. Fifth Embodiment

An example of an editing process of causing the image processing device 1 to change depth representation using depth information will be described as a fifth embodiment.

FIGS. 24A, 24B, 24C, 24D, 24E, 24F, 24G, 24H, 24I, 24J, and 24K illustrate an example in which an image in which contour lines are expressed or a shadow box image is generated by cutting pixels at some depths, planarizing the pixels, and then re-synthesizing the pixels.

Figure 24:
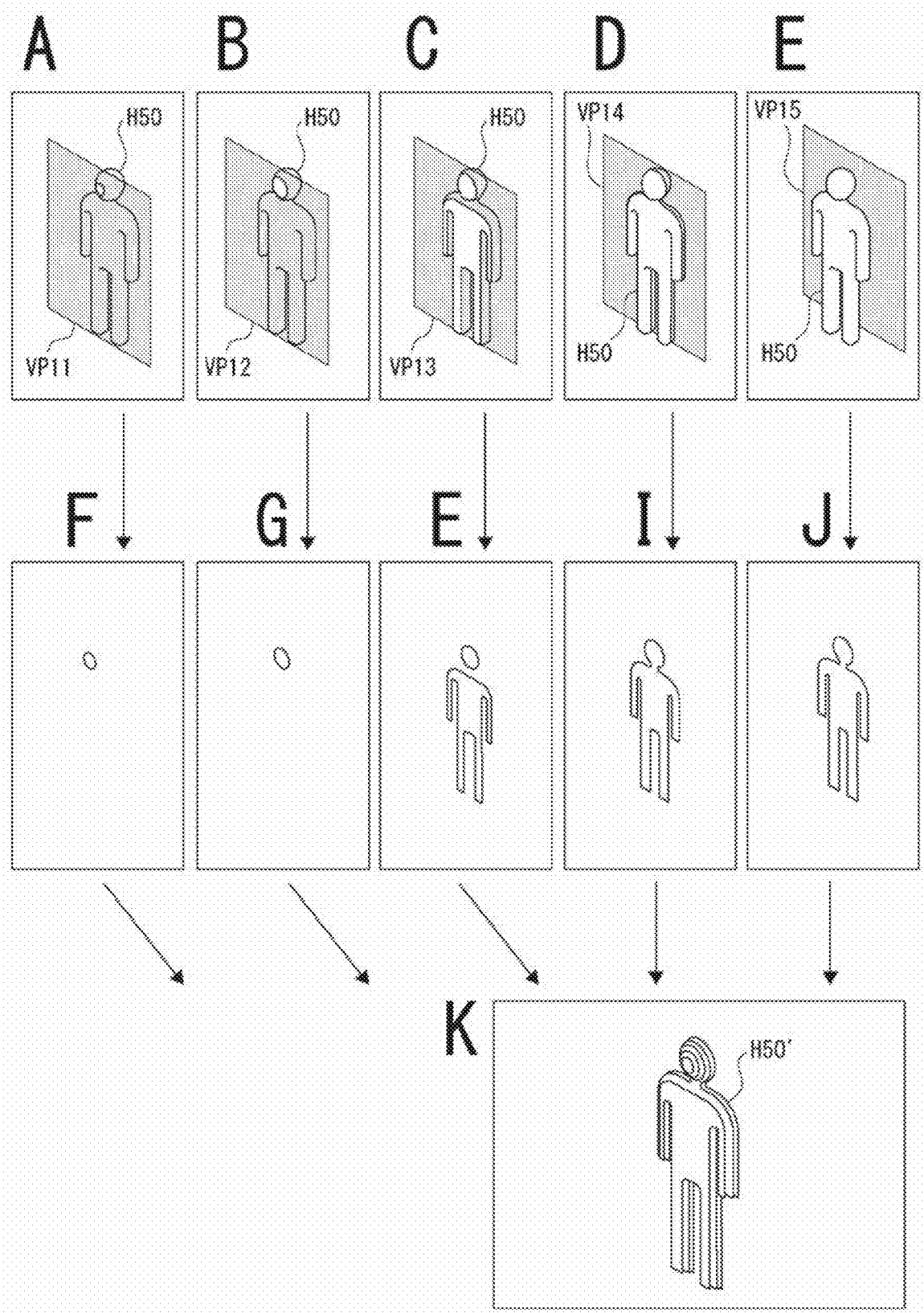
FIGS. 24A, 24B, 24C, 24D, 24E, 24F, 24G, 24H, 24I, 24J, and 24K are diagrams describing an edited image according to a fifth embodiment.

FIG. 24A illustrates a state in which trimming using a virtual vertical plane VP11 is performed on an image to be processed which includes a subject H50.

FIGS. 24B, 24C, 24D, and 24E illustrate states in which trimming using virtual vertical planes VP12, VP13, VP14, and VP15 is performed, respectively, on the image to be processed.

The virtual vertical planes VP11 to VP15 are set to different depths.

Images obtained by generating a plurality of trimming images which are cut from one image to be processed using different depths and planarizing the trimming images are illustrated in FIGS. 24F, 24G, 24H, 24I, and 24J. Planarization means that the depths of cut pixels are uniformized.

Then, the planarized images are synthesized to overlap each other. Accordingly, an edited image of a shadow box can be generated like a subject H50' illustrated in FIG. 24K.

Figure 25:
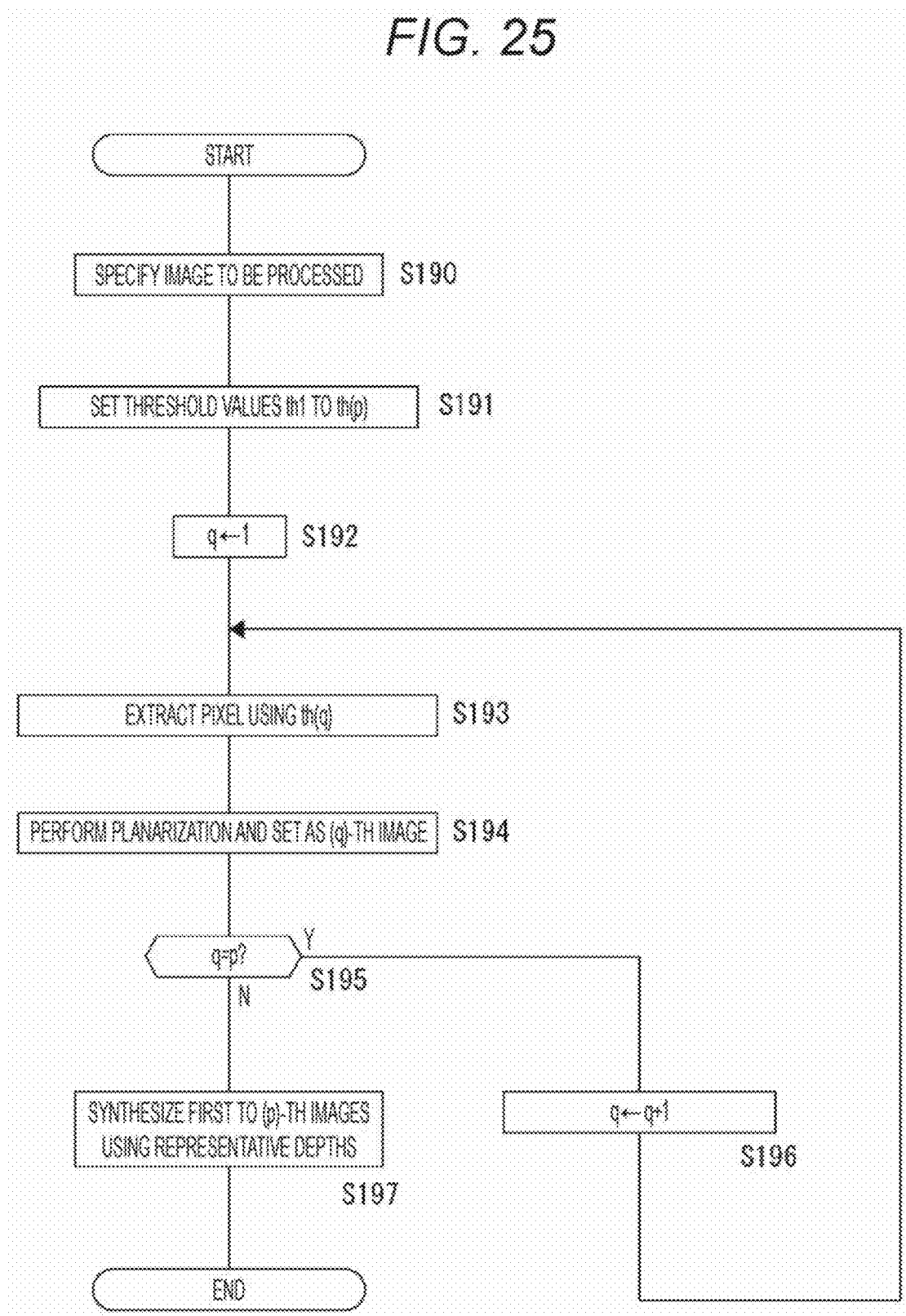
FIG. 25 is a flowchart illustrating an image editing process according to the fifth embodiment.

FIG. 25 illustrates an example of the process flow.

The image processing device 1 specifies an image to be processed in step S190.

In step S191, the image processing device 1 sets threshold values th1 to th(p) as reference depth information.

The threshold values th1 to th(p) are values for setting depths for trimming such as the virtual vertical planes VP11 to VP15.

Figure 26:
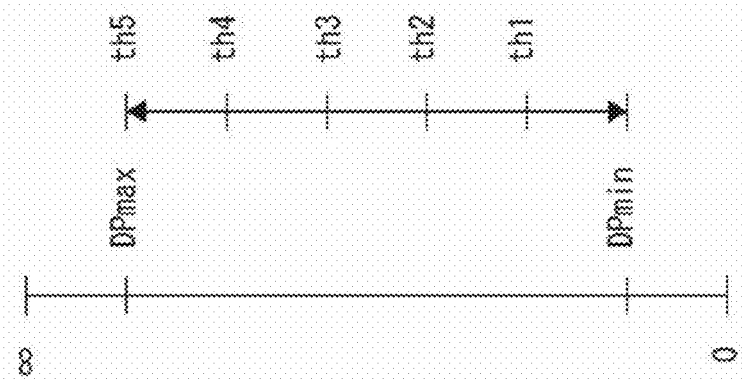
FIGS. 26A, 26B, and 26C are diagrams describing depth threshold values according to the fifth embodiment.

An example in which the threshold values th are set is illustrated in FIG. 26A. For example, some threshold values th1 to th7 are set in a depth range of 0 to a maximum depth (∞). The widths of depths partitioned by the threshold values th1 to th7 may be equal or unequal.

FIG. 26B illustrates an example in which some threshold values th1 to th6 are set in a representative subject depth range in the depth range of 0 to a maximum depth (∞).

For example, it is assumed that fixed threshold values th1 to th(p) as illustrated in FIGS. 26A and 26B are set.

Further, the threshold values th1 to th(p) may be set depending on an image which is set as a processing object. FIG. 26C illustrates an example in which a minimum depth value (DP min) and a maximum depth value (DP max) are calculated in all pixels of the image to be processed and the range therebetween is partitioned by some threshold values th1 to th5.

By performing this setting, trimming depths suitable for the image to be processed can be set.

When p threshold values th1 to th(p) are set, the image processing device 1 sets a parameter q=1 in step S192 of FIG. 25 and then performs the process of step S193.

In step S193, the image processing device 1 extracts pixels using a threshold value th(q). That is, pixels of which the depth is on the nearer side than the threshold value th(q) are extracted.

Then, in step S194, the image processing device 1 generates a (q)-th image in which the extracted pixels are planarized.

The image processing device 1 checks whether or not the parameter q satisfies q=p in step S195, increases the parameter q in step S196 when the parameter q has not reached p, and performs the process of step S193 again.

That is, through the processes of steps S192 to S196, trimming using the threshold values th1 to th(p) are performed and first to (p)-th images which are planarized are generated.

When the parameter q satisfies q=p finally through the above processes, the image processing device 1 synthesizes the first to (p)-th images at representative depths thereof in step S197. The depths of the threshold values th1 to th(p) can be used as the representative depths.

As a result, the edited image as illustrated in FIG. 24K is generated.

That is, an edited image in which the shape of a subject seems to be changed to be simple can be generated by processing depth information step by step.

An example in which a collage-like synthetic image is generated will be described below.

Figure 27:
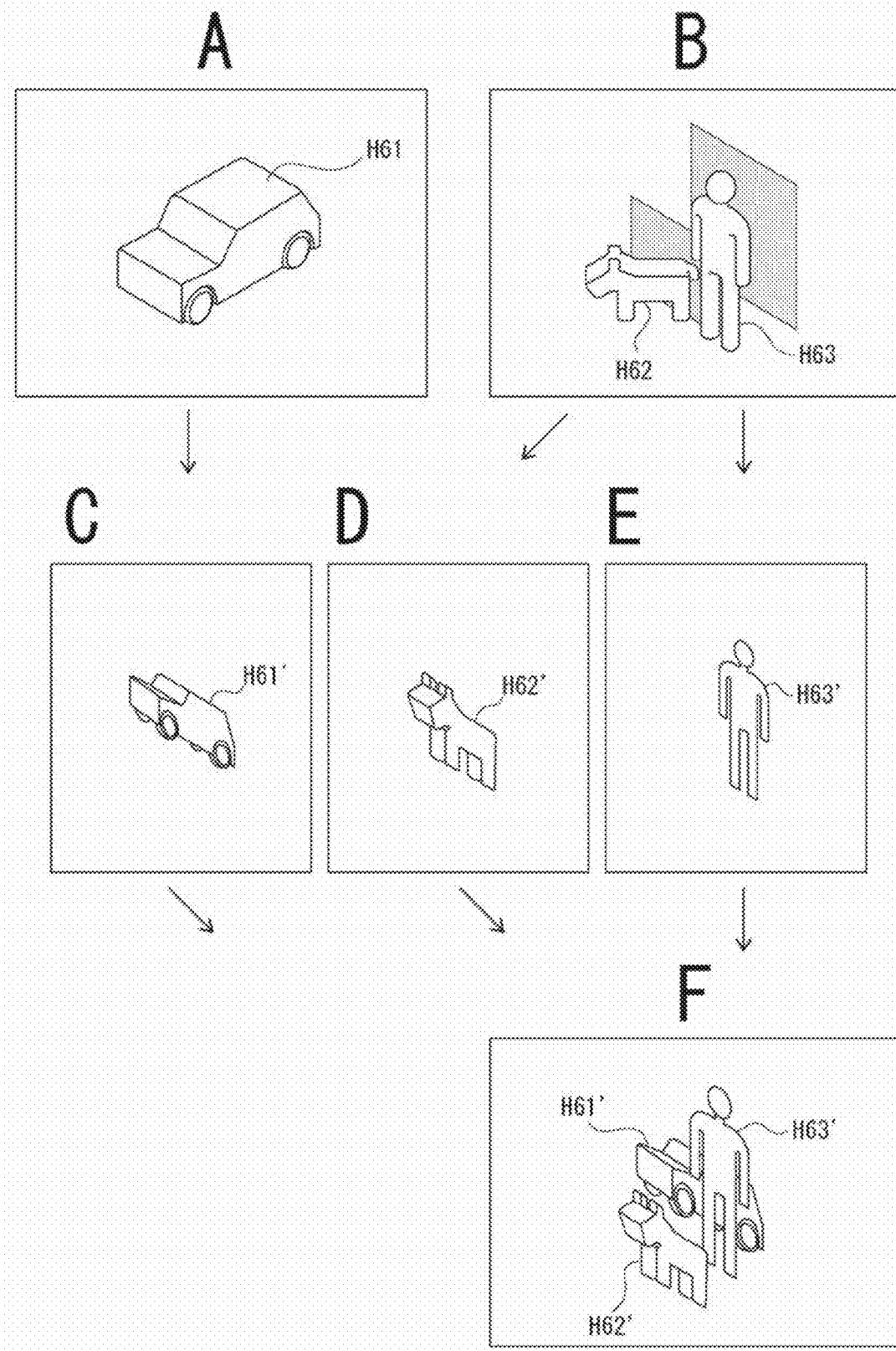
FIGS. 27A, 27B, 27C, 27D, 27E, and 27F are diagrams describing another example of an edited image according to the fifth embodiment.

A subject H61 is extracted from an image illustrated in FIG. 27A. Further, subjects H62 and H63 are extracted from an image illustrated in FIG. 27B.

These subjects can be extracted using the depth threshold value th, for example, as described in the first embodiment. Further, as described above with reference to FIGS. 11A, 11B, 11C, 11D, and 12, the subjects can be more accurately cut by extracting the subjects using the threshold value th and subject recognition based on image analysis.

FIGS. 27C and 27D illustrate examples in which the cut subjects H61 and H62 are deformed to subjects H61' and H62'. FIG. 27D illustrates a subject H63' obtained by planarizing the subject H63.

A synthetic image illustrated in FIG. 27F is obtained by synthesizing the subjects H61', H62', and H63' using a predetermined depth relationship. A collage-like synthetic image is generated.

An example of the process example is illustrated in FIG. 28.

The image processing device 1 sets a parameter q to q=1 in step S201 and specifies an image to be processed by a user's operation in step S202.

In step S203, the image processing device 1 sets a threshold value th for extracting a subject as reference depth information in accordance with a user's operation.

In step S204, the image processing device 1 extracts a pixel from the image to be processed using the threshold value th. That is, a pixel of which the depth is on the nearer side than the threshold value th is extracted.

In step S205, the image processing device 1 generates a (q)-th image by performing a process such as deformation or planarization on the extracted pixel.

In step S206, a user's intention of whether or not other synthesis material is to be selected is ascertained. When a user performs an operation of selecting other image material, the parameter q is increased in step S207 and then the process flow returns to step S202. Then, through the processes of steps S202 to S205, the (q)-th image as other synthesis material is generated.

When it is determined that first to (q)-th images are generated as synthesis materials, the user performs an operation of giving an instruction of a synthesis process. The image processing device 1 causes the process flow to transition from step S206 to step S208 and synthesizes the first to (q)-th images at predetermined depths. In this case, the anteroposterior relationship between the images may be set using the depth of the threshold value th at the time of trimming.

Accordingly, an edited image in which a plurality of subject images are collaged is generated as illustrated in FIG. 27F. That is, various image representations are possible.

Incidentally, the depth information DP of the pixels can also be used at the time of synthesis in step S208. For example, the anteroposterior can be set using the depth information DP of the pixels in the original images.

Alternatively, the depth information DP of the pixels may be ignored and the anteroposterior relationship may be set on the basis of a user's operation or the like.

Further, size change can also be considered as a process of deforming a cut image material.

7. Conclusion and Modified Examples

The following advantageous effects can be obtained in the above-mentioned embodiments.

The image processing device 1 in the first to fifth embodiments includes the reference depth setting unit 4 that sets reference depth information (such as the threshold values th and thI and the depth reference value DPref) serving as a reference for comparison with depth information DP of a pixel in an image which is set as a processing object. Further, the image processing device 1 includes the image editing processing unit 5 that performs an image editing process using the reference depth information and the depth information DP of the pixel in the image to be processed.

That is, the image processing device 1 compares the depth information DP of a pixel with the reference depth information and performs image processing based on the result of comparison. Accordingly, various image editing processes based on the depth of the subject, for example, processes such as overlapping of subjects, trimming, synthesis of graphics, characters, or the like, and application of an optical effect, can be performed. Particularly, in editing images, image representation in which images naturally match a space of subject images with a depth is possible.

Further, a user can easily perform various and advanced image processing without any sense of hesitation. Particularly, a more natural edited image can be generated without requiring a user for advanced skills.

Accordingly, a user can achieve extension of image representations.

In general, image representations are greatly affected by a user's skill and functions and performance of tools, but a representation range is expected to extend greatly with the technology according to these embodiments. A user can more easily achieve representations close to the user's intention and can expect an effect based on use in combination unlike general effects and thus a representation variation extends greatly.

Further, these embodiments can contribute to development of social media.

The technology according to the embodiments can be expected to be accepted by a wide user layer due to diversity and easiness of representations thereof. Accordingly, representations in social media diversify and an interesting communication environment can be provided.

Further, the embodiments can also contribute to image analysis technology. Tools that automatically perform identification of a subject or a boundary line and determination of a depth by image analysis of contrast, face, parse, or the like are known, but any thereof has a limit in terms of accuracy for determination in an image. According to the embodiments, more accurate determination of a subject image is possible using depth information. Accordingly, it is also possible to obtain an edited image with higher accuracy.

In the first to fifth embodiments, the reference depth setting unit 4 sets reference depth information (such as the threshold values th and thI and the depth reference value DPref) on the basis of a user's operation input.

That is, a user can arbitrarily set reference depth information which is used for image processing.

Accordingly, image processing based on the assumption of a certain space with a depth in a two-dimensional image can be performed on the basis of a depth (a distance in the depth direction) which is desired by a user. Then, an environment in which image representations in consideration of various depths can be easily performed can be provided to a user.

For example, by enabling inputting of a depth through an operation of a slider as illustrated in FIG. 2B, it is possible to realize simple operations.

Incidentally, a user's operation input is not limited to operations using an operator such as a slider. For example, operation forms using an angular velocity sensor, an inclination sensor, a vibration sensor, or the like which is mounted in a smartphone, a camera, or the like can also be considered. For example, by causing user to tilt a mobile device, a depth of a threshold value th for trimming or an inclination angle of a virtual plane can be selected.

In the first embodiment, a threshold value th of a depth is set as reference depth information, and a trimming image of a subject which is extracted on the basis of the result of comparison between depth information DP of each pixel of an image to be processed and the threshold value th of the depth is generated (see FIGS. 5A, 5B, 5C, 5D, 6A, 6B, 6C, 6D, 7, 8, 9A, 9B, 10A, 10B, 11A, 11B, 11C, 11D, and 12).

Accordingly, a trimming image can be generated by setting an image as a certain space with a depth and extracting a subject on the nearer side (or the deeper side) than a certain depth.

In the first embodiment, a common threshold value th for comparison with all pixels of an image which is set as a processing object is set (see FIGS. 5A, 6A, 6B, and 7).

That is, one threshold value th is set, the threshold value th is compared with depth information DP of all the pixels of the image to be processed, and pixels to be displayed are extracted on the basis of the result of comparison.

Accordingly, a virtual vertical plane VP1 can be provided at a position with a certain depth which is determined by a depth threshold value th and an image acquired by trimming a subject on the nearer side (or the deeper side) than the virtual vertical plane VP1 can be generated. Accordingly, an image cut according to the depth of a subject at the time of capturing an image can be generated.

In the first embodiment, a plurality of depth threshold values th0-0 to th(n-m) are set and depth information DP of a pixel is compared with the depth threshold value th corresponding to the pixel for each pixel (see FIGS. 5C, 5D, 6C, 6D, 8, 9A, 9B, 10A and 10B).

For example, a depth threshold value th is set for each area of an image or a depth threshold value th is set for each pixel. Then, depth information DP of each pixel is compared with the corresponding depth threshold value th and pixels to be displayed are extracted.

Accordingly, a trimming image which is cut with a virtual horizontal plane VP2, a virtual inclined plane VP3, or the like as a reference in a virtual three-dimensional space which is assumed for an image to be processed can be generated. For example, images with various representations such as a state in which a part of a subject is submerged, a state in which a part of a subject protrudes from a wall, and a state in which a part of a subject rises to the surface of water can be generated.

In the first embodiment, an example in which information of a subject to be trimmed is acquired, and an image editing process of generating a trimming image using the result of comparison of each pixel of an image to be processed with a depth threshold value th and the result of determination of whether or not the pixel is a pixel in the subject to be trimmed is performed has been described (see FIGS. 11A, 11B, 11C, 11D, and 12).

In this case, it is also determined whether or not each pixel is a pixel in a subject using subject recognition based on image analysis as well as the result of comparison in depth, and pixels to be displayed are extracted on the basis of the results thereof.

Accordingly, trimming in consideration of a type of a subject as well as extraction based on a depth is possible. For example, even when it is intended to trim a subject person at a certain depth and another object or the like appears at the same depth, an image in which only the subject person is trimmed can be generated. Accordingly, various trimming editing in consideration of a depth is possible.

Further, this is useful for a case where it is intended to accurately trim only a specific subject.

That is, a specific subject can be accurately trimmed in combination with shape recognition, object recognition, color recognition, and the like in order to prevent mixing of a color of another subject located at a position which is to be trimmed.

Incidentally, the result of comparison in depth and the result of subject determination are considered to be used in an OR logic or a condition in which the result of subject determination has priority as well as an AND logic as in the example illustrated in FIG. 12.

In the AND logic, a pixel which is on the nearer side or the deeper side than a specific depth and which is a pixel in a subject which is designated to be trimmed is selected as a display object. Accordingly, this is suitable for a case where it is intended to generate an image in which only a subject at a certain depth is accurately cut. Alternatively, when the depth of the subject spans over a depth threshold value th, an image in which only a part of the subject (pixels on the nearer side or the deeper side than a specific depth) is displayed can be generated.

In the OR logic, a pixel which is on the nearer side or the deeper side than a specific depth and a pixel in a subject which is designated to be trimmed are selected together as a display object. Accordingly, a trimming image in which all subjects on the nearer side or the deeper side than a certain depth and a designated subject are mixed can be generated and thus various trimming editing is possible.

In the condition in which the result of subject determination has priority, for example, even when a part of a subject designated to be trimmed is at a depth at which it is not extracted using the depth information DP, the part is also displayed. That is, an image in which all the designated subjects are displayed and a subject extracted as the result of comparison in depth with a threshold value th are displayed together can be generated, which can also provide various image editing.

Further, in the first embodiment, a depth threshold value th is set as reference depth information, and a process of setting a pixel which is determined to be one of the nearer side and the deeper side than the depth threshold value th as a pixel to be displayed and replacing a value of a pixel determined to be the other with another value on the basis of the result of comparison between depth information DP of each pixel in an image to be processed and the depth threshold value th is performed (see S106 in FIGS. 7 and 8 and S121 in FIG. 12).

That is, depending on whether a pixel is on the nearer side or the deeper side than a threshold value th, a pixel is classified into a pixel to be displayed without any change or a pixel of which a pixel value is replaced.

Accordingly, an image in which a subject on the nearer side (or the deeper side) than a certain depth is extracted and a state on the deeper side (or the nearer side) is different from that of the original image when the image is considered as a certain space having a depth, for example, a trimming image, a synthetic image, or the like, can be generated.

For example, in the first embodiment, an example in which an image editing process of replacing pixels values of all the pixels, which are determined to be on the other relative to one of the nearer side and the deeper side than the depth of the threshold value th, with a value for not displaying a subject or a value for giving a display effect is performed has been described (see S106 in FIGS. 7 and 8 and S121 in FIG. 12).

For example, by replacing a pixel value of a pixel of a subject, which is determined to be the other with respect to the depth threshold value th, with a value for not displaying a subject (mask data) such that the pixel value is a pixel value not associated with the original subject, a trimming image in which a subject on the other side is masked (is not displayed) and only a subject on one side is displayed can be generated (see FIGS. 5A, 5B, 5C, 5D, 6A, 6B, 6C, and 6D).

In this case, when all the pixel values (luminance values) on the other side are replaced with the same value, a trimming image in which the background has a monochromatic tone can be generated. Alternatively, by replacing the pixel values on the other side with pixel values indicating the same color in consideration of a pixel block, a trimming image in which the background has a specific color can be generated.

Incidentally, the color of the mask may be selected by a user, or the luminance/color of the mask may be set to a fixed state.

Further, by changing the color or the luminance of the mask depending on an area, various edited images in which the background of a trimming image includes a pattern or gradates may be realized, for example.

Further, for example, when a pixel of a subject which is determined to be on the other side with respect to the depth threshold value th is replaced with a value for applying an image effect to the subject, an image in which a subject on one side is displayed as in the original image and an image effect is applied to a subject on the other side can be generated. For example, an image in which a part other than a subject which is extracted as in the original image is subjected to a process such as monochromatization, a decrease in luminance, blurring, or mosaic processing can be generated (see FIGS. 10C and 10D and S121 in FIG. 12).

In the first embodiment, an example in which an image editing process of replacing a pixel value of a pixel which is determined to be on the other side other than the side to be trimmed with a pixel value of another image is performed has been descried (see FIGS. 10C and 12).

For example, when a pixel value of a pixel of a subject determined to be on the other side with respect to the depth threshold value th is replaced with a pixel value of a pixel of another image, an image in which a subject on one side is displayed as in the original image and a subject of another image is synthesized on the other side can be generated. Accordingly, it is possible to provide various image editing environments. For example, a synthetic image or an image of multiple exposure can be realized.

In the second embodiment, an example in which an insertion depth (a threshold value th1) is set as reference depth information and an image editing process of determining an anteroposterior relationship between pixels of a second image and pixels of a first image on the basis of the result of comparison between the depth information DP of each pixel of the first image and the insertion depth (the threshold value th1) and generating a synthetic image on the basis of the result of determination is performed as a process of synthesizing the second image into the first image has been described (see FIGS. 13A, 13B, 13C, 13D, 14A, 14B, 14C, 14D, and 15).

In this case, when the second image is synthesized and disposed at a certain depth position in the first image, the anteroposterior relationship between a subject of the first image and the insertion depth (the threshold value th1) is determined. Accordingly, a synthetic image in which an object as characters or graphics which are two-dimensionally generated seems to actually exist in a three-dimensional space of the subject of the first image can be obtained. That is, characters/graphics can be synthesized into the first image which is a photograph image having a depth with a natural feeling.

Further, in the second embodiment, an example in which image effect processing based on an insertion depth is performed on a second image has been described (see FIGS. 16A, 16B, 16C, and 17).

The second image is synthesized to be inserted into the first image at a depth position of a set insertion depth. An image effect corresponding to the insertion depth is applied to the second image.

Further, when a plurality of second images are synthesized with different insertion depths, image effects corresponding to the insertion depths are applied to the second images.

Accordingly, a synthetic image in which characters or graphics as the second images seem to actually exist in a subject space in which the first image has been captured can be generated.

In the third embodiment, an image editing process of setting a depth reference value DPref as reference depth information, setting an image effect level EP on the basis of the result of comparison between the depth information DP of each pixel of an image to be processed and the depth reference value DPref, and performing image effect processing on the image to be processed has been described (see FIGS. 18A, 18B, 18C, and 19).

Accordingly, an image to which an image effect with a natural feeling is applied can be generated. For example, an image effect of giving a representation of mist, cloud, or flare can be embodied in an image effect state which is very close to actual mist or cloud.

Further, a representation of giving an optical effect such that lighting from a virtual light source is performed or the like is possible.

In the fourth embodiment, an example in which an insertion depth (a threshold value th1) is set as reference depth information and an image editing process of changing the sizes of one or both of a subject of a first image and a subject of a second image, determining an anteroposterior relationship between pixels of the second image and pixels of the first image on the basis of the result of comparison between the depth information DP of pixels of the first image and the insertion depth (the threshold value th1), and generating a synthetic image on the basis of the result of determination, as a process of synthesizing the second image with the first image, is performed has been described (see FIGS. 21A, 21B, 21C, 21D, 21E, 22A, 22B, 22C, and 23).

In this case, a synthetic image in which the size relationship between different images is set or is changed to an improbable size relationship is obtained. The synthetic image reflects an anteroposterior relationship between subjects, and an image which gives a natural feeling but is actually improbable, for example, can be generated. Accordingly, an image representation range can be extended.

Further, by performing overlapping in consideration of size information, it can be applied to usage for causing an added value such as time lapse, catalog, or group photograph.

A representation of time lapse is a representation in which the absolute sizes of subjects are unified and size statuses of subjects having a varying size (such as growth of a plant or an animal) are simultaneously represented, for example, using a distance to a subject, a subject size in an image, and the like, and depth information. With the technology according to the fourth embodiment, an image indicating a state in which a size varies in a time series can be generated, for example, by performing synthesis such that subjects such as a plant or an animal having a changed size are arranged on the background.

In the fourth embodiment, an example in which a subject image which is trimmed from the second image is synthesized into the first image has been described.

For example, a synthesis process of trimming a subject of a part of the second image, changing the sizes of one or both of the subject of the first image and the subject of the second image, and inserting the trimmed subject of the second image into the first image is performed (see FIGS. 21A, 21B, 21C, 21D, 21E, 22A, 22B, 22C, and 23).

Accordingly, a synthetic image in which a subject acquired by changing the size of the subject of the second image seems to actually exist in a subject space in which the first image has been captured can be obtained.

Further, it is possible to realize improvement in processing efficiency using a trimmed image.

In the fourth embodiment, an example in which image effect processing based on an insertion depth is performed on a subject image which is trimmed from the second image has been described (see S179 in FIG. 23).

For example, the second image of which the size relationship with the first image has changed is synthesized to be inserted into the first image at a depth position of a set insertion depth. An image effect corresponding to the insertion depth is applied to the second image.

Further, when a plurality of second images are synthesized with different insertion depths, image effects corresponding to the insertion depths are applied to the second images.

Accordingly, a synthetic image in which a subject of the second image of which the size has changed seems to actually exist in a subject space in which the first image has been captured can be obtained. For example, it is possible to obtain an image which gives a more natural feeling, that is, in which a subject of a second image seems to exist as an actual subject in a first image, by image effects of adding background blurring, shadow, shading on the assumption of light from a light source, flare, mist, cloud, or the like.

In the fifth embodiment, an example in which an image editing process of setting a plurality of depth threshold values th1 to th(p) as reference depth information and synthesizing images acquired by planarizing pixels extracted using the depth threshold values th1 to th(p) into an image to be processed is performed has been described (see FIGS. 24A, 24B, 24C, 24D, 24E, 24F, 24G, 24H, 24I, 24J, 24K, 25, 26A, 26B, and 26C).

Accordingly, an image simplified based on a depth such as an image of a shadow box or the like or an image representing contour lines can be obtained. As a result, it is possible to extend an image representation range.

Further, in the fifth embodiment, an example in which a plurality of depth threshold values are set in a range between a minimum value and a maximum value as depth information of each pixel of an image to be processed has been described (see FIG. 26C).

Accordingly, a plurality of depth threshold values th1 to th(p) are set such that a subject can be appropriately cut depending on details of an image, and an image of a shadowbox or the like can be more effectively generated.

In the fifth embodiment, an example in which an image editing process of setting one or a plurality of depth threshold values th as reference depth information, extracting subject images from one or a plurality of images using the set one or plurality of depth threshold values th, and synthesizing the extracted subject images has been described (see FIGS. 27A, 27B, 27C, 27D, 27E, 27F, and 28).

By cutting subject images using depth information and synthesizing a plurality of cut subject images, for example, a collage-like image of various subjects can be obtained, which also enables extension of an image representation range.

Incidentally, in the above-mentioned embodiments, a still image is used as an image to be processed, but the present technology can be applied to a moving image. By applying the processes according to the embodiments to each frame, a trimming moving image, a moving image into which characters/graphics are inserted, a moving image on which image effect processing based on a depth has been performed, a moving image of a subject like a shadow box, and the like can also be generated. A subject of another image can also be inserted into each frame of a moving image.

A program according to an embodiment of the invention is a program causing an information processing device to perform: a reference depth setting step of setting reference depth information serving as a comparison reference for depth information of pixels in an image which is set as a processing object; and an image editing processing step of performing an image editing process using the reference depth information and the depth information of the pixels of the image which is set as the processing object.

That is, the program according to the embodiment is a program causing an information processing device to perform the process flows illustrated in FIGS. 7, 8, 12, 15, 17, 19, 23, 25, and 28.

The image processing device 1 according to the embodiments can be easily realized using such a program.

Further, the program can be stored in advance in a recording medium which is incorporated into a device such as a computer device, a ROM in a microcomputer including a CPU, or the like. Alternatively, the program can be temporarily or permanently stored in a removable recording medium such as a semiconductor memory, a memory card, an optical disk, a magneto-optical disc, or a magnetic disc. Further, such a removable recording medium can be provided as a so-called software package.

Further, such a program can be installed in a personal computer or the like from the removable recording medium or can be downloaded from a download site via a network such as a LAN or the Internet.

Incidentally, the advantageous effects described in this specification are merely exemplary but are not restrictive and other advantageous effects may be achieved.

Incidentally, the present technology can also provide the following configurations.

(1) An image processing device including:

a reference depth setting unit configured to set reference depth information serving as a comparison reference for depth information of pixels in an image which is set as a processing object; and an image editing processing unit configured to perform an image editing process using the reference depth information and the depth information of the pixels of the image which is set as the processing object.

(2) The image processing device according to (1), in which the reference depth setting unit sets the reference depth information in response to an operation input.

(3) The image processing device according to (1) or (2), in which the reference depth setting unit sets a depth threshold value as the reference depth information, and the image editing processing unit performs an image editing process of generating a trimming image of an extracted subject on the basis of a result of comparison between the depth information of each pixel of the image which is set as the processing object and the depth threshold value.

(4) The image processing device according to (3), in which the reference depth setting unit sets a common depth threshold value which is compared with all the pixels of the image which is set as the processing object.

(5) The image processing device according to (3), in which the reference depth setting unit sets a plurality of depth threshold values, and the image editing processing unit compares the depth information of each pixel with the depth threshold value corresponding to the pixel for each pixel.

(6) The image processing device according to any one of (3) to (5), in which the image editing processing unit acquires information of a subject to be trimmed, and the image editing processing unit performs an image editing process of generating a trimming image using a result of comparison with the depth threshold value for each pixel of the image to be processed and a result of determination of whether or not the pixel is a pixel of the subject to be trimmed.

(7) The image processing device according to (1) or (2), in which the reference depth setting unit sets a depth threshold value as the reference depth information, and the image editing processing unit performs a process of setting a pixel which is determined to be one of a near side and a deep side of the depth threshold value as a pixel to be displayed and replacing a value of a pixel which is determined to be the other of the near side and the deep side with another value on the basis of a result of comparison between the depth information of each pixel of the image which is set as the processing object and the depth threshold value.

(8) The image processing device according to (7), in which the image editing processing unit performs an image editing process of replacing a pixel value with a value for not displaying a subject or a value for giving a display effect on all the pixels which are determined to be the other of the near side and the deep side.

(9) The image processing device according to (7), in which the image editing processing unit performs an image editing process of replacing a pixel value of which pixel is determined to be the other of the near side and the deep side with a pixel value of another image.

(10) The image processing device according to (1) or (2), in which the reference depth setting unit sets an insertion depth as the reference depth information, and the image editing processing unit performs an image editing process of determining an anteroposterior relationship between a pixel of a second image and a pixel of a first image on the basis of a result of comparison between the depth information of each pixel of the first image and the insertion depth and generating a synthetic image on the basis of a result of determination as a process of synthesizing the second image with the first image.

(11) The image processing device according to (10), in which the image editing processing unit performs image effect processing based on the insertion depth on the second image.

(12) The image processing device according to (1) or (2), in which the reference depth setting unit sets a depth reference value as the reference depth information, and the image editing processing unit performs an image editing process of setting an image effect level on the basis of a result of comparison between the depth information and the depth reference value for each pixel of the image which is set as the processing object and performing image effect processing on the image which is set as the processing object.

(13) The image processing device according to (1) or (2), in which the reference depth setting unit sets an insertion depth as the reference depth information, and the image editing processing unit performs an image editing process of changing the sizes of one or both of a subject of a first image and a subject of a second image, determining an anteroposterior relationship between a pixel of the second image and a pixel of the first image on the basis of a result of comparison between the depth information of each pixel of the first image and the insertion depth and generating a synthetic image on the basis of a result of determination as a process of synthesizing the second image with the first image.

(14) The image processing device according to (13), in which the image editing processing unit performs a process of synthesizing a subject image trimmed from the second image with the first image.

(15) The image processing device according to (13) or (14), in which the image editing processing unit performs image effect processing based on the insertion depth on a subject image trimmed from the second image.

(16) The image processing device according to (1) or (2), in which the reference depth setting unit sets a plurality of depth threshold values as the reference depth information, and in which the image editing processing unit performs an image editing process of synthesizing images obtained by planarizing pixels extracted using the depth threshold values from the image which is set as the processing object.

(17) The image processing device according to (16), in which the image editing processing unit sets a plurality of depth threshold values in a range of from a minimum value to a maximum value as the depth information of each pixel of the image to be processed.

(18) The image processing device according to (16), in which the reference depth setting unit sets one or a plurality of depth threshold values as the reference depth information, and the image editing processing unit performs an image editing process of extracting subject images from one or a plurality of images using the set one or plurality of depth threshold values and synthesizing the extracted subject images.

(19) An image processing method which is performed by an information processing device, the image processing method including:

a reference depth setting process of setting reference depth information serving as a comparison reference for depth information of pixels in an image which is set as a processing object; and an image editing processing step of performing an image editing process using the reference depth information and the depth information of the pixels of the image which is set as the processing object.

(20) A program causing an information processing device to perform:

a reference depth setting step of setting reference depth information serving as a comparison reference for depth information of pixels in an image which is set as a processing object; and an image editing processing step of performing an image editing process using the reference depth information and the depth information of the pixels of the image which is set as the processing object.

REFERENCE SIGNS LIST

1 Image processing device
2 Image acquiring unit
3 Depth acquiring unit
4 Reference depth setting unit
5 Image editing processing unit
6 Image output unit
10 Operation unit
11 Display unit
12 Communication unit
13 Storage unit
14 Image source
100 Information processing device
101 Mobile terminal
102 Screen
110 Slider
111 Operation button

The invention claimed is:

1. An image processing device, comprising:
a central processing unit (CPU) configured to:
set a first image as a processing object, wherein the first image comprises a plurality of subjects;
select a first subject of the plurality of subjects based on a first user operation;
set reference depth information as a comparison reference for depth information of each pixel of a plurality of pixels of the first image;
compare the depth information of each pixel of the plurality of pixels of the first image with the set reference depth information;
determine a set of pixels of the plurality of pixels, wherein the set of pixels corresponds to the selected first subject; and
edit the first image based on the determined set of pixels and the comparison of the depth information of each pixel of the plurality of pixels of the first image with the set reference depth information.

2. The image processing device according to claim 1, wherein the CPU is further configured to set the reference depth information based on a second user operation.

3. The image processing device according to claim 1, wherein the CPU is further configured to:
set a depth threshold value as the reference depth information;
compare the depth information of each pixel of the plurality of pixels of the first image with the set depth threshold value; and
generate a trimming image of the first subject based on the comparison of the depth information of each pixel of the plurality of pixels of the first image with the depth threshold value.

4. The image processing device according to claim 3, wherein the CPU is further configured to set a common depth threshold value for the plurality of pixels of the first image.

5. The image processing device according to claim 3, wherein the CPU is further configured to:

set a plurality of depth threshold values for the plurality of pixels of the first image; and compare the depth information of each pixel of the plurality of pixels of the first image with a corresponding depth threshold value of the plurality of depth threshold values.

6. The image processing device according to claim 1, wherein the CPU is further configured to:

set a depth threshold value as the reference depth information;

compare the depth information of each pixel of the plurality of pixels of the first image with the set depth threshold value;

determine that each pixel of the plurality of pixels of the first image is one of a near side or a deep side of the depth threshold value based on the comparison of the depth information of each pixel of the plurality of pixels of the first image with the set depth threshold value;

display a first pixel of the plurality of pixels of the first image, wherein the first pixel is one of a near side or a deep side of the depth threshold value; and replace a first pixel value of a second pixel of the plurality of pixels of the first image with a second value, wherein the second pixel is other of one of the near side or the deep side of the depth threshold value.

7. The image processing device according to claim 6, wherein the CPU is further configured to control, based on the second pixel value of the second pixel, one of display of a second subject of the plurality of subjects or a display effect on the second subject, the second subject is associated with the second pixel, and the second subject is different from the first subject.

8. The image processing device according to claim 1, wherein the CPU is further configured to:

set an insertion depth as the reference depth information;

compare the depth information of each pixel of the plurality of pixels of the first image with the set insertion depth;

determine an anteroposterior relationship between a pixel of a plurality of pixels of a second image and a pixel of the plurality of pixels of the first image based on the comparison of the depth information of each pixel of the plurality of pixels of the first image with the insertion depth; and synthesize the second image with the first image based on the determination of the anteroposterior relationship.

9. The image processing device according to claim 8, wherein the CPU is further configured to apply an effect on the synthesized image based on the insertion depth on the second image.

10. The image processing device according to claim 1, wherein the CPU is further configured to:

set a depth reference value as the reference depth information;

compare the depth information of each pixel of the plurality of pixels of the first image with the set depth reference value;

set an image effect level based on the comparison of the depth information of each pixel of the plurality of pixels of the first image with the depth reference value; and apply an effect on the first image based on the set image effect level.

11. The image processing device according to claim 1, wherein the CPU is further configured to:

set an insertion depth as the reference depth information;

compare the depth information of each pixel of the plurality of pixels of the first image with the set insertion depth;

change a size of at least one of the selected first subject of the first image or a subject of a second image;

determine an anteroposterior relationship between a pixel of a plurality of pixels of the second image and a pixel of the plurality of pixels of the first image based on the comparison of the depth information of each pixel of the plurality of pixels of the first image with the insertion depth; and synthesize the second image with the first image based on the determination of the anteroposterior relationship.

12. The image processing device according to claim 11, wherein the CPU is further configured to synthesize the first subject with a subject image trimmed from the second image.

13. The image processing device according to claim 11, wherein the CPU is further configured to apply an effect on the synthesized image based on the insertion depth on a subject image trimmed from the second image.

14. The image processing device according to claim 1, wherein the CPU is further configured to:

set a plurality of depth threshold values as the reference depth information;

extract planarizing pixels from the plurality of pixels of the first image for each depth threshold value of the plurality of depth threshold values;

obtain a plurality of third images based on the extracted planarizing pixels; and synthesize the obtained plurality of images.

15. The image processing device according to claim 14, wherein each value of the plurality of depth threshold values is in a range of from a first value to a second value, and the second value is greater than the first value.

16. The image processing device according to claim 14, wherein the CPU is further configured to:

set at least one depth threshold value of the plurality of depth threshold values as the reference depth information;

obtain at least one third image of the plurality of third images based on the at least one threshold value;

extract subject images from the at least one image; and synthesize the extracted subject images.

17. An image processing method, comprising:

in an information processing device:

setting an image as a processing object, wherein the image comprises a plurality of subjects;

selecting a subject of the plurality of subjects based on a user operation;

setting reference depth information as a comparison reference for depth information of each pixel of a plurality of pixels of the image;

comparing the depth information of each pixel of the plurality of pixels of the image with the set reference depth information;

determining a set of pixels of the plurality of pixels, wherein the set of pixels corresponds to the selected subject; and editing the image based on the determined set of pixels and the comparison of the depth information of each pixel of the plurality of pixels of the first image with the set reference depth information.

18. A non-transitory computer-readable medium having stored thereon, computer-executable instructions which, when executed by a processor, cause the processor to execute operations, the operations comprising:
- setting an image as a processing object, wherein the image comprises a plurality of subjects;
- selecting a subject of the plurality of subjects based on a user operation;
- setting reference depth information as a comparison reference for depth information of each pixel of a plurality of pixels of the image;
- comparing the depth information of each pixel of a plurality of pixels of the image with the set reference depth information;
- determining a set of pixels of the plurality of pixels, wherein the set of pixels corresponds to the selected subject; and
- editing the image based on the determined set of pixels and the comparison of the depth information of each pixel of the plurality of pixels of the first image with the set reference depth information.

* * * * *